(12) United States Patent
Matzen et al.

(10) Patent No.: US 12,305,720 B2
(45) Date of Patent: May 20, 2025

(54) COUPLING MEMBERS THAT JOIN FIRST AND SECOND ROTARY MEMBERS

(71) Applicant: John Crane UK Limited, Slough (GB)

(72) Inventors: Paul Matzen, Barnton (GB); Klaus-Dieter Meck, Manchester (GB)

(73) Assignee: JOHN CRANE UK LIMITED, Slough (GB)

(*) Notice: Subject to any disclaimer, the term of this patent is extended or adjusted under 35 U.S.C. 154(b) by 543 days.

(21) Appl. No.: 17/625,537

(22) PCT Filed: Jul. 9, 2020

(86) PCT No.: PCT/GB2020/051658
§ 371 (c)(1),
(2) Date: Jan. 7, 2022

(87) PCT Pub. No.: WO2021/005375
PCT Pub. Date: Jan. 14, 2021

(65) Prior Publication Data
US 2022/0275839 A1  Sep. 1, 2022

Related U.S. Application Data

(60) Provisional application No. 62/871,827, filed on Jul. 9, 2019.

(30) Foreign Application Priority Data

Jul. 26, 2019 (GB) .................................. 1910750

(51) Int. Cl.
*F16D 3/72* (2006.01)
(52) U.S. Cl.
CPC ............ *F16D 3/72* (2013.01); *F16D 2250/00* (2013.01); *Y10T 403/453* (2015.01)

(58) Field of Classification Search
CPC ..... F16D 3/72; F16D 2250/00; Y10T 403/453
(Continued)

(56) References Cited

U.S. PATENT DOCUMENTS 1,664,052 A * 3/1928 Ungar .................. F16D 3/74
464/80
5,000,722 A  3/1991 Zilberman
(Continued)

FOREIGN PATENT DOCUMENTS

CN  105221656 A  1/2016
CN  105276080 A  1/2016
(Continued)

OTHER PUBLICATIONS

International Search Report, International Application No. PCT/IB2020/056479, Date of Mailing Sep. 28, 2020, European Patent Office; International Search Report 9 pages.
(Continued)

*Primary Examiner* — Greg Binda
(74) *Attorney, Agent, or Firm* — CANTOR COLBURN LLP

(57) ABSTRACT

Coupling members to join two rotary members, such that the coupling members (300) include a unitary body having a first coupling element (302), a second coupling element (304), and a hub (306), wherein the unitary body forms a single piece with the hub (306) extending between and connecting the first coupling element (302) to the second coupling element (304). The first coupling element (302) defines a first plane, the second coupling element (304) defines a second plane with the first and second planes being parallel, and the hub (306) defines a hub axis normal to the first and second planes. Each of the first and second coupling elements (302, 304) comprises a plurality of connection elements (308, 310) arranged about a respective circumfer- (Continued)

ence having a respective radius extending from the hub axis, wherein a material of the respective coupling element in a respective circle and in a respective plane is less than the area of the circle. The material forming the first and second coupling elements (302, 304) is arranged in a respective circumscribing circle over an area less than the total area defined by the circle in the respective plane.

9 Claims, 14 Drawing Sheets

(58) Field of Classification Search
USPC .................................. 464/79, 80; 403/223
See application file for complete search history.

(56) References Cited

U.S. PATENT DOCUMENTS

| | | | |
|---|---|---|---|
| 5,588,917 A | 12/1996 | D'Ercole | |
| 7,618,326 B2* | 11/2009 | Mermoz | F16D 3/725 |
| 9,163,673 B2* | 10/2015 | Kastner | B32B 37/16 |

| | | | |
|---|---|---|---|
| 2005/0255926 A1 | 11/2005 | Piasecki et al. | |
| 2006/0003847 A1 | 1/2006 | Mermoz | |
| 2007/0049379 A1 | 3/2007 | Faass et al. | |

FOREIGN PATENT DOCUMENTS

| | | | | |
|---|---|---|---|---|
| CN | 109210144 B | | 12/2022 | |
| DE | 19543187 A1 | | 5/1997 | |
| EP | 3546780 A1 | | 10/2019 | |
| FR | 364764 | * | 8/1906 | ............ 464/79 |
| FR | 2872234 A1 | | 12/2005 | |
| GB | 179769 A | | 5/1922 | |
| JP | H0253527 U | | 4/1990 | |
| KR | 101437627 B1 | | 9/2014 | |
| SU | 711308 | * | 1/1980 | ............ 464/80 |

OTHER PUBLICATIONS

International Written Opinion, International Application No. PCT/IB2020/056479, Date of Mailing Sep. 28, 2020, European Patent Office; International Written Opinion 12 pages.
International Search Report, International Application No. 202080063187.3, Date of Mailing: May 28, 2024, International Search Report, 8 pages.

* cited by examiner

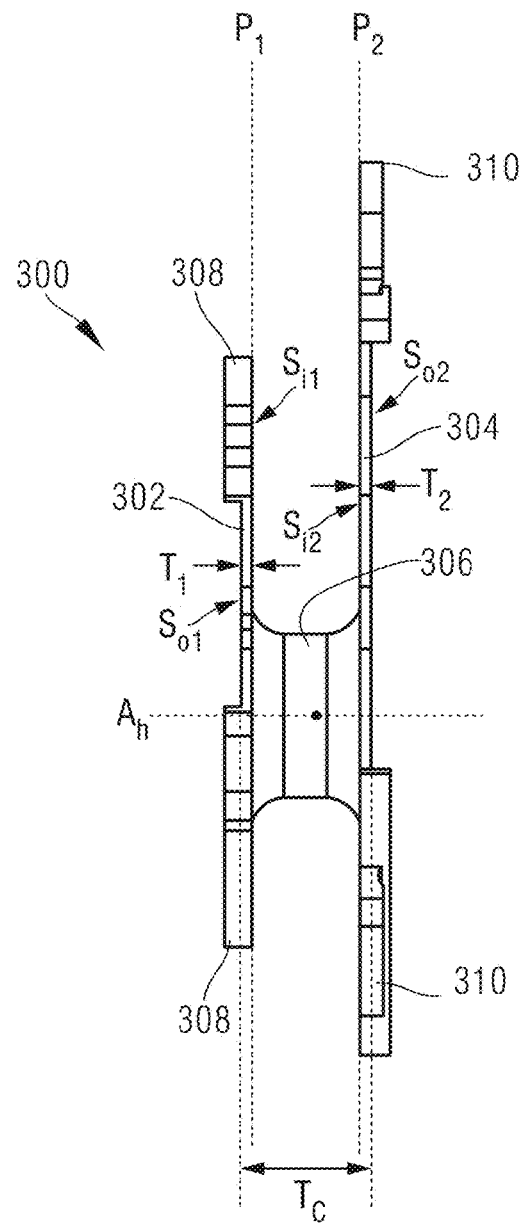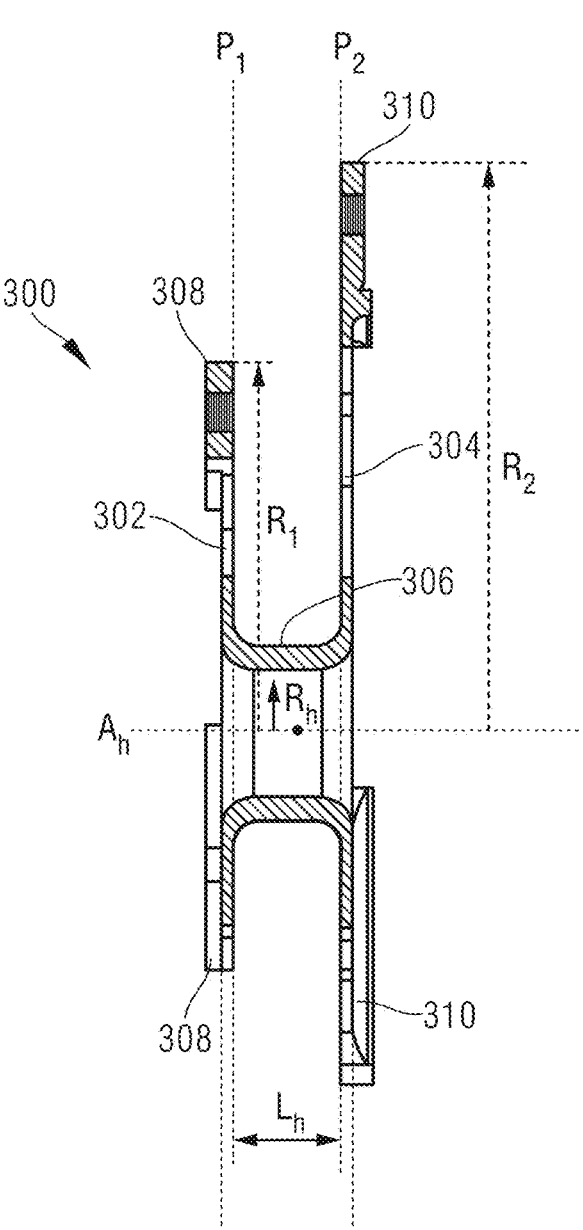

COUPLING MEMBERS THAT JOIN FIRST AND SECOND ROTARY MEMBERS

CROSS REFERENCE TO RELATED APPLICATIONS

This is a US National Stage of Application No. PCT/GB2020/051658, filed on Jul. 9, 2020, which claims the benefit of U.S. Provisional Application No. 62/871,827 filed Jul. 9, 2019, and further claims the benefit of GB Application No. 1910750.7 filed Jul. 26, 2019, the disclosures of which are incorporated herein by reference.

BACKGROUND

Exemplary embodiments pertain to the art of couplings, and specifically couplings for rotating equipment.

For the transmission of rotational energy from one machine to another (i.e., torque transmission), two shafts may be coupled together, with one machine driving a first shaft and the other machine being driven by a second shaft. A coupling may be provided to engage and connect the first shaft to the second shaft to enable transmission of torque and/or rotational energy. The coupling may be configured to improve the connection and efficiency of the connection and transmission of energy from one machine to another.

For example, in order to accommodate misalignment and torque transmission from one shaft to another, a flexible coupling may be employed between the rotatable shafts. In some configurations, based on the machines and/or installation thereof, the rotatable shafts may have fixed or variable misalignment (e.g., misalignment of axes, misalignment of end facings of shafts, etc.). The coupling may comprise one or more pieces that fixedly engages with each of the two shafts to provide a connection therebetween. Such couplings are typically connected about peripheral flanges of the shafts so as to transmit torque from one shaft to the other shaft while absorbing, and sometimes dissipating, the effects of misalignment.

However, while configured for addressing misalignment between two shafts, conventional couplings may still have a limited degree of flexibility, and thus may not be able to accommodate some misalignments (e.g., variable, extreme angles, etc.). For example, for a given misalignment, the coupling is subjected to high stresses (e.g., from a drive shaft). Due to the high stresses, the coupling will respond with high reaction forces transmitted to the connected shaft (e.g., a driven shaft). If, during operation, the misalignment changes due to unforeseen circumstances, the coupling may fail due to fatigue fractures or other impacts. In addition, if the connected machines are modified to result in an increase in misalignment compared to the original set-up, the coupling may not be appropriate anymore and thus may require redesign or reconfigured to avoid costly failures. One common way of increasing misalignment tolerance is to incorporate (additional) flexible elements into the coupling. However, such additional flexible elements may increase a weight and expense of the construction of the coupling.

Accordingly, a structural design is desired which can reduce fatigue and stress fractures from increased misalignment, and may be more flexible and lighter without adding to the fabrication cost.

BRIEF DESCRIPTION

In accordance with some embodiments, coupling members of a first example embodiment, to join first and second rotary members, are provided. The coupling members of the first example embodiment include a unitary body having a first coupling element, a second coupling element, and a hub, wherein the unitary body forms a single piece with the hub extending between and connecting the first coupling element to the second coupling element. The first coupling element defines a first plane, the second coupling element defines a second plane with the first and second planes being parallel, and the hub defines a hub axis normal to the first and second planes, the first coupling element comprises a plurality of first connection elements arranged about a circumference of a first circle having a first radius extending from the hub axis, wherein a material of the first coupling element in the first circle and in the first plane is less than the area of the first circle, and the second coupling element comprises a plurality of second connection elements arranged about a circumference of a second circle having a second radius extending from the hub axis, wherein a material of the second coupling element in the second circle and in the second plane is less than the area of the second circle.

In addition to one or more of the features described above, or as an alternative, at least one of the first coupling element and the second coupling element may comprise at least one thick portion, at least one thin portion, and at least one linking portion, wherein the linking portion has an intermediate thickness, less than the thickness of the thick portion and thicker than the thin portion.

In addition to one or more of the features described above, or as an alternative, the linking portion may joins the thick portion to the thin portion. The coupling elements may thus have a stepped, for example terraced construction, in which the thin, thick, and linking portions provide steps of different height.

At least one of the thick portion, the linking portion and the thin portion may comprise a flat surface, parallel to a plane of the at least one of the first coupling element and the second coupling element.

The edge of the thick portion, adjacent the linking portion, may be chamfered. For example, the entirety of the edge of the thick portions bounding the linking portion, may be chamfered. Likewise a some or all of the edges of the linking portions bounding the thin portions, may also be chamfered.

At least one of the first coupling element and the second coupling element may comprise material voids, in which the material of said coupling element is absent. The material voids may be surrounded by one or more of the linking portions. For example, the material voids may be bounded by one or more of said linking portions. The edges of the linking portions which bound the material voids may be chamfered.

In addition to one or more of the features described above, or as an alternative, further embodiments of the coupling members of the first example embodiment may include that the hub has a third radius that is less than each of the first radius and the second radius.

In addition to one or more of the features described above, or as an alternative, further embodiments of the coupling members of the first example embodiment may include that the plurality of connection elements of the first coupling element are arranged in a triangular orientation.

In addition to one or more of the features described above, or as an alternative, further embodiments of the coupling members of the first example embodiment may include that the plurality of connection elements of the first coupling element are located at the end of structural branches of the first coupling element.

In addition to one or more of the features described above, or as an alternative, further embodiments of the coupling members of the first example embodiment may include that at least one of the first coupling element and the second coupling element include one or more material voids formed therein.

In addition to one or more of the features described above, or as an alternative, further embodiments of the coupling members of the first example embodiment may include that the material of the first coupling element in the first circle and in the first plane is equal to or greater than 80% the area of the first circle.

In addition to one or more of the features described above, or as an alternative, further embodiments of the coupling members of the first example embodiment may include that the material of the second coupling element in the second circle and in the second plane is equal to or greater than 70% the area of the second circle.

In addition to one or more of the features described above, or as an alternative, further embodiments of the coupling members of the first example embodiment may include that the hub enables relative movement between the first coupling element and the second coupling element.

In addition to one or more of the features described above, or as an alternative, further embodiments of the coupling members of the first example embodiment may include that a material area of the material of the first coupling element in the first circle and in the first plane is equal to a material area of the material of the second coupling element in the second circle and in the second plane.

In addition to one or more of the features described above, or as an alternative, further embodiments of the coupling members of the first example embodiment may include that the area of the first circle is equal to the area of the second circle.

In addition to one or more of the features described above, or as an alternative, further embodiments of the coupling members of the first example embodiment may include that the area of the first circle is different than the area of the second circle.

In addition to one or more of the features described above, or as an alternative, further embodiments of the coupling members of the first example embodiment may include that a geometric shape of the material of the first coupling element in the first circle and in the first plane is different from a geometric shape of the material of the second coupling element in the second circle and in the second plane.

In accordance with some embodiments, coupling members of a second example embodiment, to join first and second rotary members, are provided. The coupling members of the second example embodiment include a unitary body having a first coupling element, a second coupling element, and a hub, wherein the unitary body is a single, unitary piece form of a single material with the hub extending between the first coupling element and the second coupling element, the hub defining a hub axis therethrough. The first coupling element is a non-circular structure defined, in part, in a first plane normal to the hub axis, wherein a plurality of first connection elements are arranged about a first circle in the first plane at a first radius from the hub axis, wherein the non-circular structure of the second coupling element occupies less area than the first circle in the first plane. The second coupling element is a non-circular structure defined, in part, in a second plane, wherein a plurality of second connection elements are arranged about a second circle in the second plane at a second radius from the hub, wherein the non-circular structure of the second coupling element occupies less area than the second circle in the first plane. In the second example embodiment, the first plane is parallel to the second plane.

In addition to one or more of the features described above, or as an alternative, further embodiments of the coupling members of the second example embodiment may include that an area of the first non-circular coupling element in the first plane comprises material that is a percentage of an area of the first circle that is less than 100%.

In addition to one or more of the features described above, or as an alternative, further embodiments of the coupling members of the second example embodiment may include that an area of the second non-circular coupling element in the second plane comprises material that is a percentage of an area of the second circle that is less than 100%.

In addition to one or more of the features described above, or as an alternative, further embodiments of the coupling members of the second example embodiment may include that the material of the first coupling element in the first circle and in the first plane is equal to or greater than 80% the area of the first circle.

In addition to one or more of the features described above, or as an alternative, further embodiments of the coupling members of the second example embodiment may include that the material of the second coupling element in the second circle and in the second plane is equal to or greater than 70% the area of the second circle.

In addition to one or more of the features described above, or as an alternative, further embodiments of the coupling members of the second example embodiment may include that at least one of the first coupling element and the second coupling element has a triangular shape within the respective first and second planes.

In addition to one or more of the features described above, or as an alternative, further embodiments of the coupling members of the second example embodiment may include that each of the first coupling element and the second coupling element has a triangular shape within the respective first and second planes.

In addition to one or more of the features described above, or as an alternative, further embodiments of the coupling members of the second example embodiment may include that at least one of the first coupling element and the second coupling element has a square shape within the respective first and second planes.

In addition to one or more of the features described above, or as an alternative, further embodiments of the coupling members of the second example embodiment may include that the plurality of connection elements of the first coupling element are located at the end of structural branches of the first coupling element.

In addition to one or more of the features described above, or as an alternative, further embodiments of the coupling members of the second example embodiment may include that at least one of the first coupling element and the second coupling element include one or more material voids formed therein.

In addition to one or more of the features described above, or as an alternative, further embodiments of the coupling members of the second example embodiment may include that a geometric shape of the non-circular structure of the first coupling element is different from a geometric shape of the non-circular structure of the second coupling element.

According to some embodiments, methods of forming coupling members to join first and second rotary members are provided. The methods include forming a first coupling element having a first outer surface and a first inner surface defining a first plane, forming a hub extending from the first inner surface at a first hub end to a second hub end, the hub defining a hub axis that is normal to the first plane, and forming a second coupling element on the second hub end, the second coupling element having a second inner surface defining a second plane normal to the hub axis and a second outer surface. The first plane and the second plane are parallel, and the first coupling element, the second coupling element, and the hub are formed as a single, unitary piece of a single and continuous material.

In addition to one or more of the features described above, or as an alternative, further embodiments of the methods may include that the first coupling element comprises a plurality of first connection elements arranged about a circumference of a first circle having a first radius extending from the hub axis, wherein a material of the first coupling element in the first circle and in the first plane is less than the area of the first circle, and the second coupling element comprises a plurality of second connection elements arranged about a circumference of a second circle having a second radius extending from the hub axis, wherein a material of the second coupling element in the second circle and in the second plane is less than the area of the second circle.

In addition to one or more of the features described above, or as an alternative, further embodiments of the methods may include that the first coupling element is a non-circular structure defined, in part, in a first plane normal to the hub axis, wherein a plurality of first connection elements are arranged about a first circle in the first plane at a first radius from the hub axis, wherein the non-circular structure of the second coupling element occupies less area than the first circle in the first plane, and the second coupling element is a non-circular structure defined, in part, in a second plane, wherein a plurality of second connection elements are arranged about a second circle in the second plane at a second radius from the hub, wherein the non-circular structure of the second coupling element occupies less area than the second circle in the first plane.

In addition to one or more of the features described above, or as an alternative, further embodiments of the methods may include that the forming of the first coupling element, the hub, and the second coupling element are formed by an additive manufacturing process.

In addition to one or more of the features described above, or as an alternative, further embodiments of the methods may include that the forming of the first coupling element, the hub, and the second coupling element are performed in a sequential manner, with the first coupling element formed first, then the hub, then the second coupling element.

In addition to one or more of the features described above, or as an alternative, further embodiments of the methods may include that the forming of the first coupling element, the hub, and the second coupling element are performed simultaneously.

In addition to one or more of the features described above, or as an alternative, further embodiments may provide an apparatus comprising any one of the coupling members described or claimed herein and a rigid shroud. Such a shroud may also be provided alone, for example it may be made and sold separately from the coupling member.

Such shrouds may comprise at least one connection element for fixing the shroud with respect to the second coupling element of the coupling member, and a keying feature having a shape corresponding to a portion of the coupling member and being arranged to permit only a predetermined rotational displacement of the first coupling element with respect to the second coupling element. For example, this rotational displacement may be permitted by a spacing (e.g. a clearance) between the coupling element and the keying feature, which may be arranged so that in the event that the coupling element is twisted with respect to the shroud (e.g. about the hub axis of the coupling element) by more than the predetermined rotational displacement it butts up against the keying feature. The rigid shroud can thus provide additional torsional stiffness to the coupling member if it is overloaded, but permit the original torsional flexibility to remain unaltered below that overload limit.

The keying feature may have a shape which corresponds to an edge of the first coupling element. For example it may have a complementary shape which matches at least a portion of the shape of that edge, but spaced apart from it by a selected clearance distance along the edge. The clearance distance may be selected to provide a predetermined degree of rotational displacement. The keying feature may be coplanar with the portion of the edge of the first coupling element. For example, the shroud may comprise an annular disc having an aperture, in which the keying feature is provided by a portion of an edge of the aperture. The shroud may have a height selected to match the length of the hub so that when the connection elements of the shroud and the second coupling element are fixed to a rotary member, the disc member is coplanar with the first coupling element and the first coupling member is disposed in the aperture.

The portion of the edge of the aperture which provides at least a part of the keying feature may be arranged to provide stress relief by avoiding point contact between the coupling element and the keying feature. For example keying feature may comprise a thick portion, thicker than other parts of the annular disc.

The shroud may comprise a surrounding wall, for example in the form of a cylinder. When in use the apparatus is installed on a rotary member, the hub may be coaxial (concentric) with the surrounding wall of the shroud. This surrounding wall may join the at least one connection element of the shroud to the keying feature, and may hold the keying feature in a plane defined by the first coupling element. For example the height of the shroud may match the height of the coupling member.

In these and other configurations, the keying feature may be coplanar with the first coupling element, and spaced from its edge by a clearance distance to permit only said predetermined rotational displacement, and to inhibit further rotational displacement by supporting the second coupling element to prevent it from being twisted too far by an overload torque It will be appreciated in the context of the present disclosure that this arrangement may be reversed so that the connection element of the shroud may fix the shroud with respect to the first coupling element and the keying feature may be arranged to permit only a predetermined rotational displacement of the second coupling element. If the shroud is fixed with respect to one of the first coupling element and the second coupling element, the keying feature permits a predetermined rotation of the other.

An aspect of the disclosure provides a coupling member to join first and second rotary members, the coupling member comprising: a unitary body having a first coupling element, a second coupling element, and a hub, wherein the unitary body forms a single piece with the hub extending between and connecting the first coupling element to the second coupling element, wherein: the first coupling element defines a first plane, the second coupling element defines a second plane with the first and second planes being parallel, and the hub defines a hub axis normal to the first and second planes. At least one of the first coupling element and the second coupling element may comprise at least one thicker portion, at least one thinner portion, and at least one linking portion, wherein the linking portion has an intermediate thickness, less than the thickness of the thick portion and thicker than the thin portion and the linking portion is disposed between the thick portion and the thin portion.

The thick portions, the linking portions and the thin portions may each comprise a flat surface, parallel to a plane of the at least one of the first coupling element and the second coupling element. The edge of the thick portions, adjacent the linking portions may be chamfered. The edge of the linking portions, adjacent the thin portions may also be chamfered. The at least one of the first coupling element and the second coupling element may comprise material voids, in which the material of said coupling element is absent. The material voids may be bounded by said linking portions.

The at least one of the first coupling element and the second coupling element may comprise at least two arms extending radially outward from the hub. The arms may be tapered, wherein side edges of the arms taper from a broad base near the hub toward a narrower part radially outward from the hub. The side edges of these arms may thus provide the periphery of said coupling element. Connection elements may be carried by the arms and the side edges of the arms may link adjacent connection elements to each other and/or may link the hub to the connection elements. The thick portions may occupy at least a portion of the side edges of the arms.

Thick portions may be provided along both side edges of the arms. The arms may comprise a void bounded by a linking portion of material having a first thickness, thinner than the thick portions.

The arms may comprise a thinner portion, having a second thickness thinner than the first thickness. The thinner portion may be entirely surrounded by linking portion of material having the second thickness. The edges of the linking portions adjacent the thinner portions may be chamfered. Thick portions disposed at the side edges of the arms may be bounded on their inboard edges by linking portions of material having the first thickness.

The linking portions, the thick portions and the thin portions may each comprise flat major surfaces disposed parallel to the plane of the coupling elements.

In the above aspect, the coupling member may comprise the features of any one or more of the other coupling members described or claimed herein.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3B is a side view of the coupling member of FIG. 3A;

FIG. 3C is a side cross-sectional view of the coupling member of FIG. 3A;

DETAILED DESCRIPTION

Figure 1A:
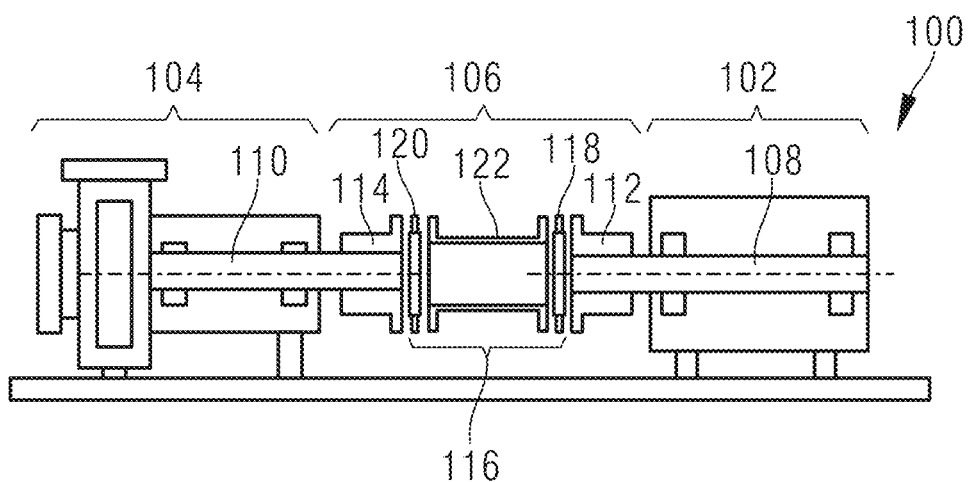
FIG. 1A is a schematic illustration of torque transmission system that may employ embodiments of the present disclosure.

A detailed description of one or more embodiments of the disclosed apparatus and method are presented herein by way of exemplification and not limitation with reference to the Figures.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

Figure 1B:
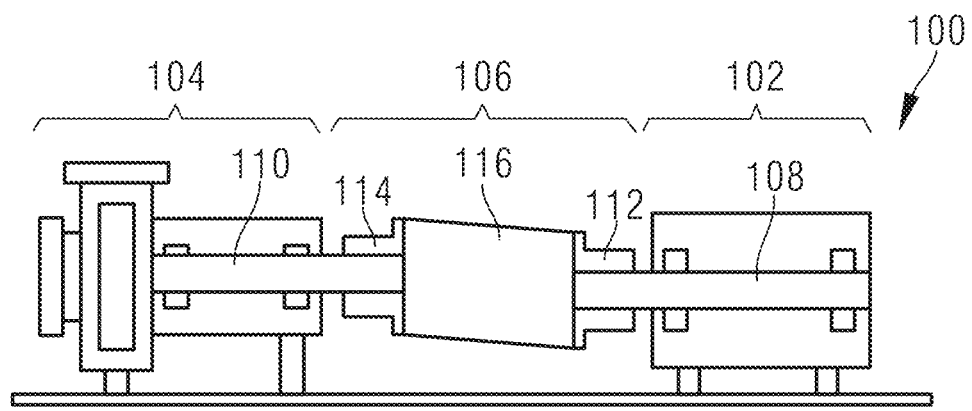
FIG. 1B is a schematic depiction of an offset between the machines of the system of FIG. 1A during use.

Turning to FIGS. 1A-1B, schematic illustrations of a system 100 are shown. The system 100 includes a first machine 102 and a second machine 104 that are operably connect by a coupling system 106. The first machine 102 may be a driving machine that drives a first rotary member 108 (e.g., a drive shaft). The second machine 104 may be a driven machine that includes a second rotary member 110 (e.g., driven shaft) that is driven by operation of the first machine 102. The first rotary member 108 is operably and fixedly connected to the second rotary member 110 by the coupling system 106.

In this embodiment, the coupling system 106 includes a first flange 112 that is attached to or part of the first rotary member 108 and a second flange 114 that is attached to or part of the second rotary member 110. Further, the coupling system 106 includes a coupling 116 that can include one or more components. For example, in this illustrative configuration, the coupling 116 of the coupling system 106 includes a first coupling member 118, a second coupling member 120, and a coupling extension member 122. In this configuration, the first coupling member 118 may be connected to the first flange 112 on the first rotary member 108 and the second coupling member 120 may be connected to the second flange 114 on the second rotary member 110. The coupling extension member 112 connects to and extends between the first coupling member 118 and the second coupling member 120.

The coupling 116 may be configured to allow for some amount of offset or misalignment between the first rotary member 108 and the second rotary member 110. For example, as shown in FIG. 1B, the coupling 116 is schematically shown (and simplified) to illustrate a lateral misalignment between the first rotary member 108 and the second rotary member 110. The coupling 116 accommodates the misalignment through flexibility provided from one or both of the first coupling member 118 and the second coupling member 120.

Although shown with two coupling members with a coupling extension member therebetween, such configurations are not to be limiting, and various other configurations are possible without departing from the scope of the present disclosure. For example, in some embodiments, a single coupling member may be configured between the two flanges, without a second coupling member or coupling extension member. In some such embodiments, the single coupling member may be flexible to enable misalignment of the rotary members (e.g., axial, angular, and/or lateral).

Figure 2A:
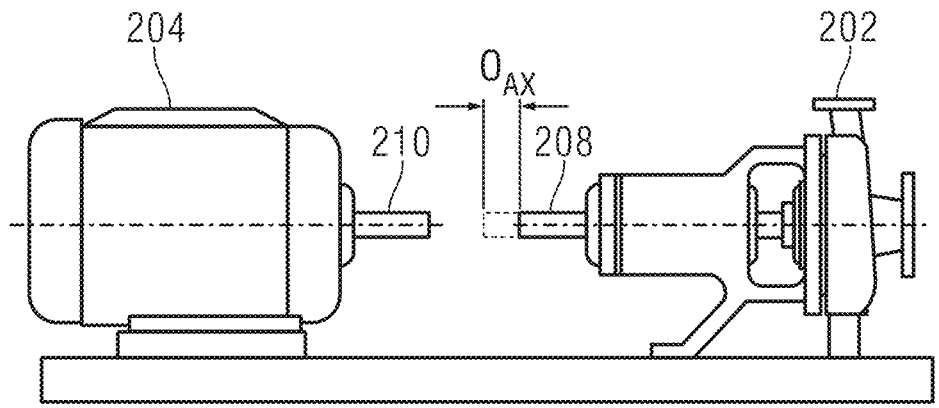
FIG. 2A illustrates an axial offset between a first rotary member and a second rotary member of a torque transmission system.
Figure 2B:
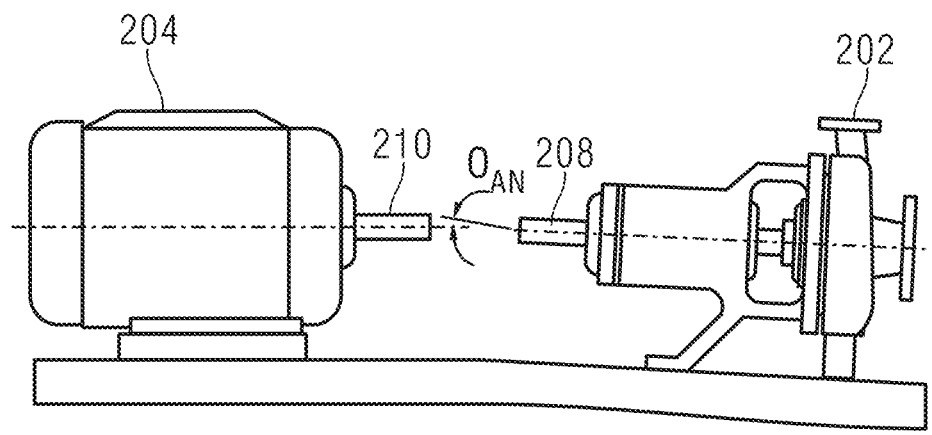
FIG. 2B illustrates an angular offset between a first rotary member and a second rotary member of a torque transmission system.
Figure 2C:
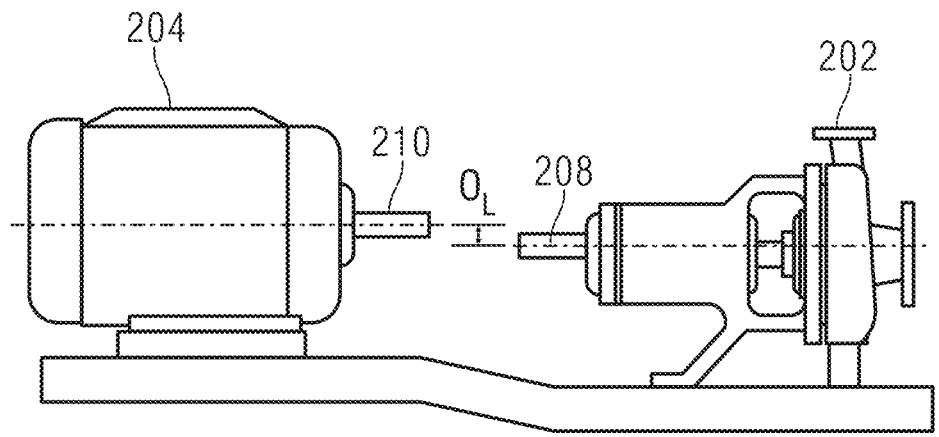
FIG. 2C illustrates a lateral offset between a first rotary member and a second rotary member of a torque transmission system.

Turning now to FIGS. 2A-2C, schematic illustrations of various illustrative offsets between a first machine 202 having a first rotary member 208 and a second machine 204 having a second rotary member 210 are shown. FIG. 2A illustrates an axial offset OAX between the first rotary member 208 and the second rotary member 210. FIG. 2B illustrates an angular offset OAN between the first rotary member 208 and the second rotary member 210. FIG. 2C illustrates a lateral offset OL between the first rotary member 208 and the second rotary member 210.

The illustrative offsets shown in FIGS. 2A-2C may be relatively exaggerated for explanatory purposes. The misalignments (i.e., the offsets) between the two rotary members may arise from, without limitation, initial residual alignments at the time of installation, thermal expansions, pipe or shaft strain, clearance or float in bearings of one or both of the machines, and foundation shifts (e.g., sediment settling, earthquakes, etc.). Further, although shown as three separate and distinct offsets and misalignments, those of skill in the art will appreciate that combinations of the types of offsets and misalignments will be typically present in real-world situations of misalignment and/or offset. Some example offsets that may be required to be addressed may be 0.25° or 0.5° angular offsets, 0.05 mm axial offset, 0.05 mm lateral offset, although other offset values may be greater or less than these examples.

Coupling members may be arranged and installed between the rotary members to allow for and/or accommodate the misalignments and offsets, while still enabling efficient transmission of rotational force from one rotary member to another. Typical coupling members may include many separate parts and elements to provide the flexibility to accommodate the different misalignments and offsets. Such coupling members may have substantial weight, have a high part count which increases probability of damage, fatigue, and/or failure, and may be costly to manufacture, install, and/or service.

Embodiments of the present disclosure are directed to single component coupling members that are light weight, flexible, and relatively simple to manufacture. For example, in accordance with some embodiments of the present disclosure, an additively manufacture (3D printed), torque-tuned coupling member concept is provided. Such coupling members can reduce coupling members of more than twenty components/parts to only one part and reduce component weight by a factor of three to four, providing more flexibility and safety in the operation of turbo-machinery or other rotational transmission systems.

Figure 3A:
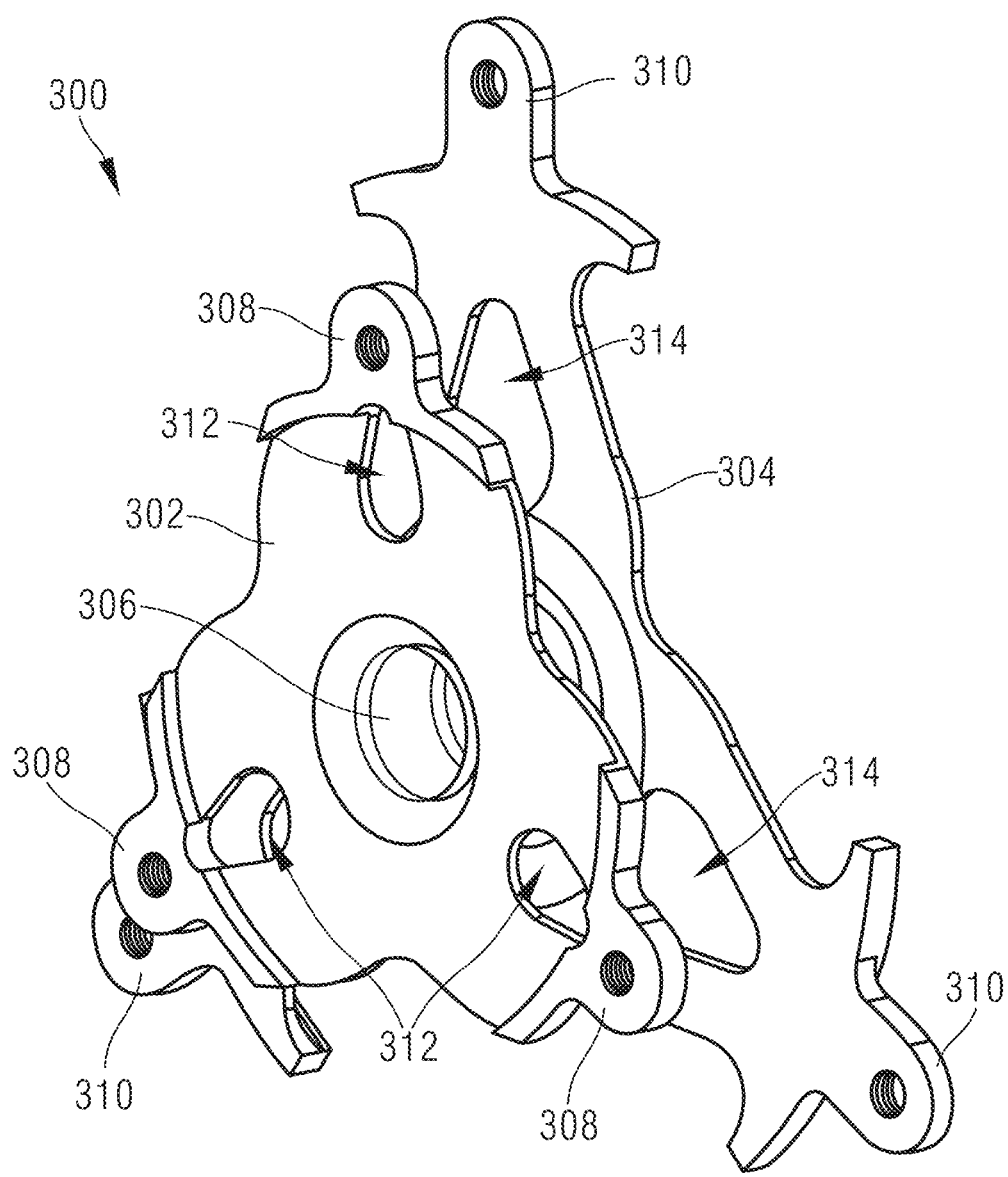
FIG. 3A is an isometric illustration of a coupling member in accordance with an embodiment of the present disclosure.
Figure 3D:
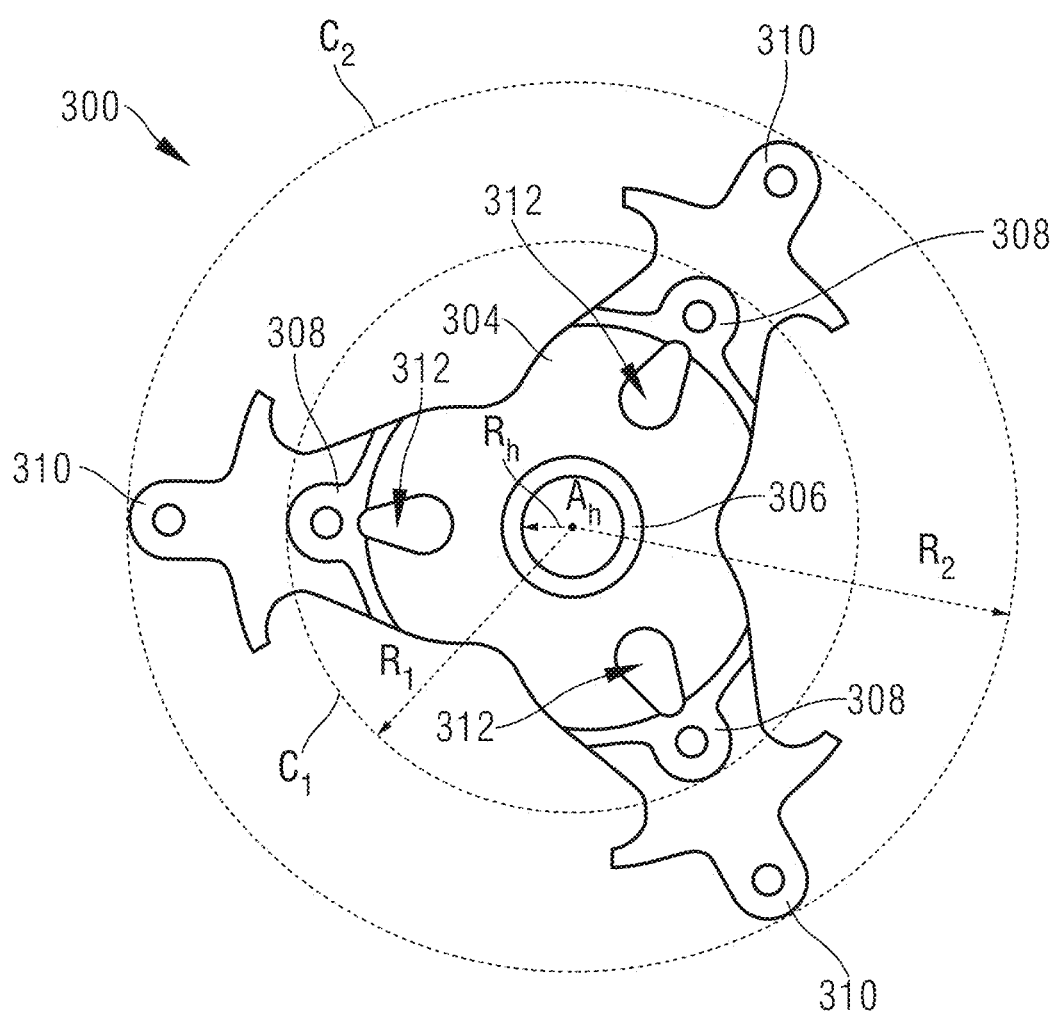
FIG. 3D is a first element plan view of the coupling member of FIG. 3A.
Figure 3E:
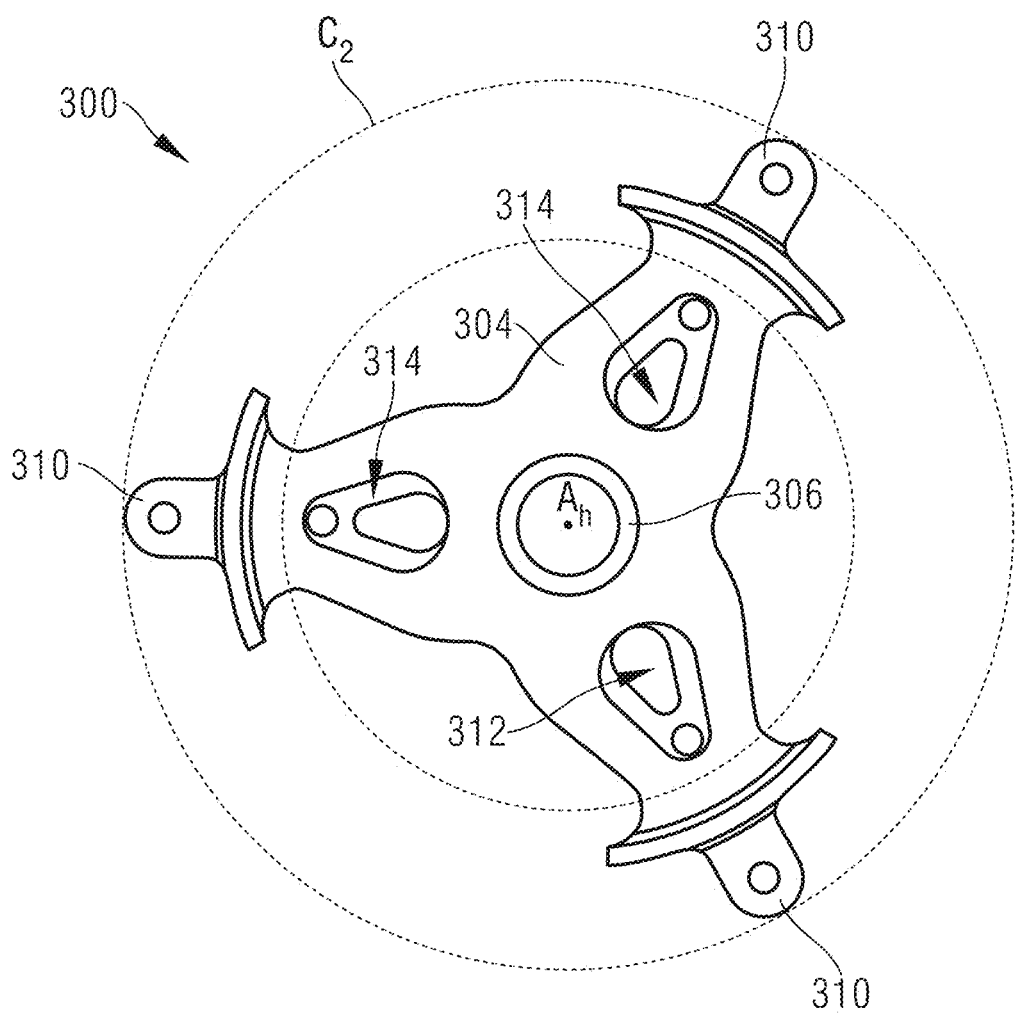
FIG. 3E is a second element plan view of the coupling member of FIG. 3A.

Turning now to FIGS. 3A-3E, schematic illustrations of a coupling member 300 in accordance with an embodiment of the present disclosure are shown. The coupling member 300 may be used to couple, join, or otherwise operably connect two separate machines, particularly two rotary members (e.g., drive shafts) to enable transmission of rotational action from one machine to the other. FIG. 3A is an isometric illustration of the coupling member 300, FIG. 3B is a side view of the coupling member 300, FIG. 3C is a side cross-sectional view of the coupling member 300, FIG. 3D is a first element plan view of the coupling member 300, and FIG. 3E is a second element plan view of the coupling member 300.

The coupling member 300 of the present disclosure is of a unitary body construction formed as a single piece or component, and does not include attached or assembled sub-parts. That is, the coupling member 300 of the present disclosure is a single piece of a continuous material without any joints, welds, fasteners, adhesives, bonding materials, or other joining/attaching features or aspects (mechanical and/or chemical). To achieve the unitary body formation of the coupling member 300 various manufacturing processes may be employed, including, without limitation, casting, molding, machining, and additive manufacturing. The specific geometry and arrangement of features of the coupling member 300 may be configured based on topology optimization. Such topology optimization is a mathematical method that optimizes material layout within a given design space, for a given set of loads, boundary conditions, and constraints with the goal of maximizing the performance of the system. Such topology optimization may be used with additive manufacturing processes to form a desired shape, geometry, and configuration of a coupling member, as described herein, or variations thereon based on the above described considerations.

The coupling member 300 includes a first coupling element 302 and a second coupling element 304 connected by a hub 306. The first coupling element 302 is formed substantially as a plate or other substantially flat structure that provides for engagement with, for example, a first rotary member of a first machine. The second coupling element 304 is formed substantially as a plate or other substantially flat structure that provides for engagement with, for example, a second rotary member of a second machine. The first coupling element 302 includes a plurality of first connection elements 308 arranged about a circle that is defined, in part, by the first coupling element 302. Similarly, the second coupling element 304 includes a plurality of second connection elements 310 arranged about a circle that is defined, in part, by the second coupling element 304. The first and second connection elements 308, 310 may include apertures (e.g., threaded apertures) for receiving fasteners to engage with a rotary member or other structure The hub 306 connects the first and second coupling elements 302, 304 and provides for flexibility (e.g., relative movement, rotation, bending, etc. between the first and second coupling elements 302, 304).

As shown in FIGS. 3B-3C, the first coupling element 302 defines a first plane $P_1$ in which the structure and material of the first coupling element 302 is formed and arranged. Similarly, the second coupling element 304 defines a second plane $P_2$ in which the structure and material of the second coupling element 304 is formed and arranged. The first plane $P_1$ and the second plane $P_2$ are substantially parallel to each other (when no load is applied to the respective coupling element 302, 304). The hub 306 defines a hub axis $A_h$, with the hub axis $A_h$ being normal to both the first plane $P_1$ and the second plane $P_2$.

Further, as shown in FIGS. 3D-3E, the first coupling element 302 defines a first circle $C_1$ in which the structure and material of the first coupling element 302 is formed and arranged. The first circle $C_1$ is a geometric shape within the first plane $P_1$ and is defined by the edges or points of the first connection elements 308 of the first coupling element 302. Similarly, the second coupling element 304 defines a second circle $C_2$ in which the structure and material of the second coupling element 304 is formed and arranged. The second circle $C_2$ is a geometric shape within the second plane $P_2$ and is defined by the edges or points of the second connection elements 310 of the second coupling element 304. That is, the connection elements 308, 310 of the respective first and second coupling elements 302, 304 are each arranged in respective circular patterns within the respective first and second planes $P_1$, $P_2$. The first circle $C_1$ and the second circle $C_2$ are centered on a point along the hub axis $A_h$ and thus the centers of the first circle $C_1$ and the second circle $C_2$ are aligned along the hub axis $A_h$.

As will be appreciated from the illustrations, the material forming the first and second coupling elements 302, 304 is arranged over an area less than that defined by the respective circles $C_1$, $C_2$, in the respective planes $P_1$, $P_2$. As such, the material occupied by the first coupling element 302 in the first plane $P_1$ is less than the area of the first circle $C_1$ in the first plane $P_1$. Similarly, the material occupied by the second coupling element 304 in the second plane $P_2$ is less than the area of the second circle $C_2$ in the second plane $P_2$. This material reduction from a full planar circle of material enables a reduction in weight of the coupling member 300.

Additional weight may be reduced by one or more material voids formed in the first and second coupling elements 302, 304. For example, as shown, the first coupling element 302 includes first material voids 312 formed within the material of the first coupling element 302 and thus further reduce the amount of material of the first coupling element 302 relative to the total area of the first circle $C_1$. Similarly, the second coupling element 304 includes second material voids 314 formed within the material of the second coupling element 304 and thus further reduce the amount of material of the second coupling element 304 relative to the total area of the second circle $C_2$. In addition to reducing a weight of the component, the material voids may enable an increased flexibility to the formed coupling elements.

Referring again to FIGS. 3B-3D, the first circle $C_1$ defined, in part, by the first coupling element 302 in the first plane $P_1$, has a first radius $R_1$. The second circle $C_2$ defined, in part, by the second coupling element 304 in the second plane $P_2$, has a second radius $R_2$. In this non-limiting and illustrative embodiment, the second radius $R_2$ is greater than the first radius $R_1$. However, in some embodiments, the first radius $R_1$ and the second radius $R_2$ may be equal, and thus the first circle $C_1$ and the second circle $C_2$ may define equal areas within the respective first and second planes $P_1$, $P_2$. Further, the hub 306 defines a hub radius $R_h$. The hub radius $R_h$ is less than either (or both) the first radius $R_1$ and the second radius $R_2$.

The first plane $P_1$ (defined by the first coupling element 302) is separated from the second plane $P_2$ (defined by the second coupling element 304) along the hub axis $A_h$. The spacing of the first coupling element 302 from the second coupling element 304 is provided by the structure of the hub 306. The hub 306 has a generally cylindrical shape, and is thus hollow along the hub axis $A_h$, and has an axial hub length $L_h$. The hub 306, as noted above, has a hub radius $R_1$. Accordingly, the hub 306 is defined as a hollow cylinder having a hub length $L_h$ and a radius $R_h$, both relative to the hub axis $A_h$.

Additionally, each of the first coupling element 302 and the second coupling element 304 may have a thickness in a direction along the hub axis $A_h$. As shown in FIG. 3B, the first coupling element 302 has a first inner surface $S_{i1}$ that is formed in the first plane $P_1$ and faces the second coupling element 304. Opposite the first inner surface $S_{i1}$ is a first outer surface $S_{o1}$ that is separated from the first inner surface $S_{i1}$ by a first thickness $T_1$ defined by a material thickness of the first coupling element 302. The second coupling element 304 has a second inner surface $S_{i2}$ that is formed in the second plane $P_2$ and faces the first coupling element 302.

Opposite the second inner surface $S_{i2}$ is a second outer surface $S_{o2}$ that is separated from the second inner surface $S_{i2}$ by a second thickness $T_2$ defined by a material thickness of the second coupling element 304. Accordingly, the coupling member 300 has a total thickness $T_c$ or dimension along the hub axis $A_h$ that is the sum of the first thickness $T_1$, the hub length $L_h$, and the second thickness $T_2$ ($T_c = T_1 + L_h + T_2$). Further, as will be apparent from the present illustrations in FIGS. 3B-3C, the first and second connection elements 308, 310 may have additional thickness in a direction outward from the respective outer surfaces $S_{1o}$, $S_{2o}$ of the first and second coupling elements 302, 304. Such additional thickness may be provided to ensure material and structural properties for mounting and connecting the coupling member 300 between rotary members of machines, as shown and described above. That is, because the coupling member 300 is configured to enable transmission of rotational motion and torque, the connection points provided by the connection elements 308, 310 may be specifically configured or designed to enable a solid and fixed connection to enable transmission of such related forces.

Figure 4A:
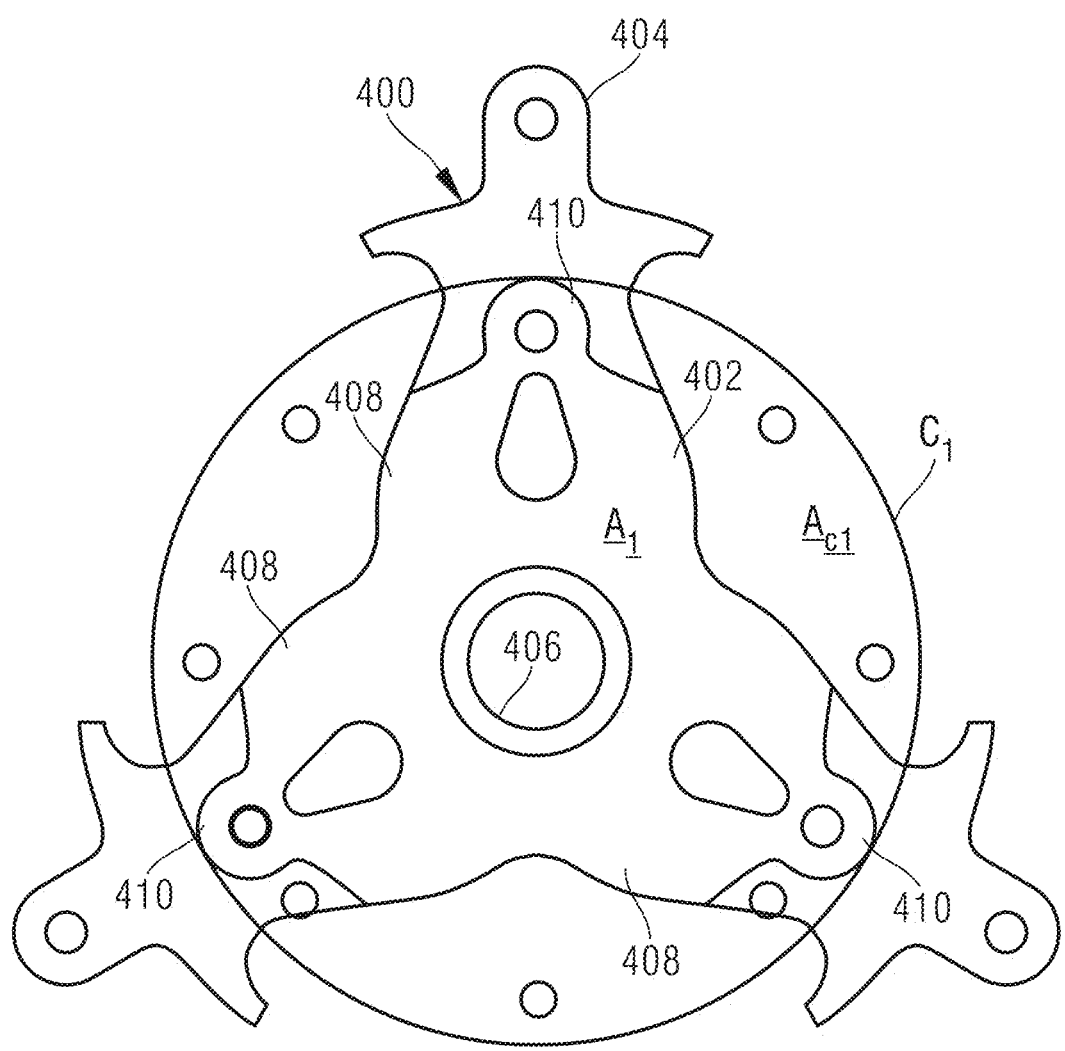
FIG. 4A is a first element plan view of a coupling member in accordance with an embodiment of the present disclosure, illustrating an area comparison to a circular coupling member.
Figure 4B:
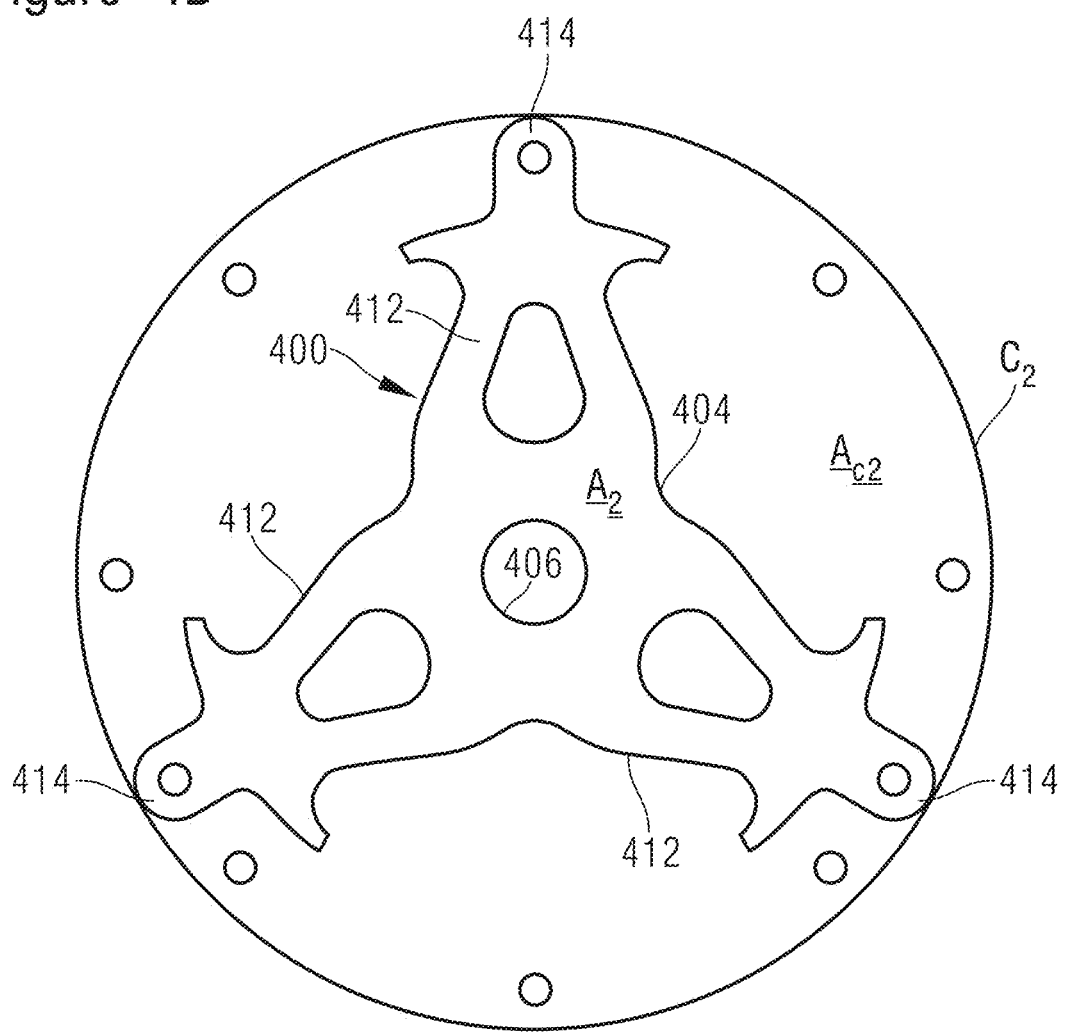
FIG. 4B is a second element plan view of the coupling member of FIG. 4A, illustrating an area comparison to a circular coupling member.

Turning now to FIGS. 4A-4B, schematic illustrations of a coupling member 400 in accordance with an embodiment of the present disclosure are shown. The coupling member 400 may be substantially similar to that shown and described above, and thus similar feature may not be labeled or described again. The coupling member 400 includes a first coupling element 402 and a second coupling element 404 that are connected by a hub 406. Each of the first coupling element 402 and the second coupling element 404 define a geometric shape in a plane, as shown and described above. The geometric shape of the first coupling element 402 encompasses a first coupling area $A_1$ and the second coupling element 404 encompasses a second coupling area $A_2$. It is noted that the first coupling area $A_1$ and the second coupling area $A_2$ are areas that exclude the central area defined by the hub 406, and that the central area defined by the hub 406 will be the same for both the first coupling area $A_1$ and the second coupling area Az.

The first coupling area $A_1$ of the first coupling element 402, as shown in FIG. 4A, is defined by the geometric shape of the material of the coupling member 400 in a respective first plane. As shown, the first coupling area $A_1$ is less than a full first circular area $A_{c1}$ defined by a first circumference $C_1$. The first coupling element 402 includes a plurality of first structural branches 408 that extend radially outward from the hub 406 to the first circumference $C_1$. The first structural branches 408 are formed of material and comprise the structure of the first coupling element 402 within a respective first plane and extend from the hub 406 to respective first connection elements 410 of the first coupling element 402. Because the first structural branches 408 occupy less area than the first circular area $A_{c1}$, the material used to form the first coupling element 402 may be less than that required for a full circular coupling element. In some non-limiting, example embodiments of the present disclosure, the first coupling area $A_1$ may be 60% or less than the first circular area $A_{c1}$. In one such non-limiting example the first coupling area $A_1$ is about 50% of the first circular area $A_{c1}$. It is noted that both the first coupling area $A_1$ and the first circular area $A_{c1}$ are lessened by the same amount defined by the hub 406, which is hollow.

The second coupling area $A_2$ of the second coupling element 404 is defined by the geometric shape of the material of the coupling member 400 in a respective second plane. As shown, the second coupling area $A_2$ is less than a full second circular area $A_{c2}$ defined by a second circumference $C_2$. The second coupling element 404 includes a plurality of second structural branches 412 that extend radially outward from the hub 406 to the second circumference $C_2$. The second structural branches 412 are formed of material and comprise the structure of the second coupling element 404 within a respective second plane and extend from the hub 406 to respective second connection elements 414 of the second coupling element 404. Because the second structural branches 412 occupy less area than the second circular area $A_{c2}$, the material used to form the second coupling element 404 may be less than that required for a full circular coupling element. In some non-limiting, example embodiments of the present disclosure, the second coupling area $A_2$ may be 60% or less than the second circular area $A_{c2}$. In one such non-limiting example the second coupling area $A_2$ is about 30% of the second circular area $A_{c2}$. It is noted that both the second coupling area $A_2$ and the second circular area $A_{c2}$ are lessened by the same amount defined by the hub 406, which is hollow.

Other percentages of coupling areas may be employed without departing from the scope of the present disclosure. For example, in some embodiments, the percentages may be such that a coupling element occupies 60% or greater of the coupling area. In still further embodiments, a coupling element occupies 70% or greater of the coupling area. In still further embodiments, a coupling element occupies 80% or greater of the coupling area. However, it is noted, the percentage will be less than 100% of the coupling area with some amount of material removed or not present within the coupling area, as described herein.

For example, as shown, both the first coupling element 402 and the second coupling element 404 include material voids formed in the various structural branches thereof. The material voids may be areas of reduced thickness or completely removed material that enables a reduction in weight and material of the coupling member without compromising the structural integrity of the coupling member. As such, the respective first and second coupling areas $A_1$, $A_2$ are reduced further by the inclusion of such material voids. The shape, number, geometry, and size of the material voids may be selected to achieve a desired structural integrity and/or strength of the formed coupling member.

Although shown with a specific geometry for the first and second coupling elements, and the first and second structural branches thereof, such geometries are not to be limiting. For example, the general geometries of the first and second coupling elements may be different (as shown they are substantially similar). Further, although shown with three structural branches extending from the hub, such configuration is not to be limiting. That is more or feature structural branches may be employed without departing from the scope of the present disclosure. Additionally, the specific geometry, shape, topology, and/or contour of the first and second structural branches and/or coupling elements may be varied from that shown and described above.

Figure 5:
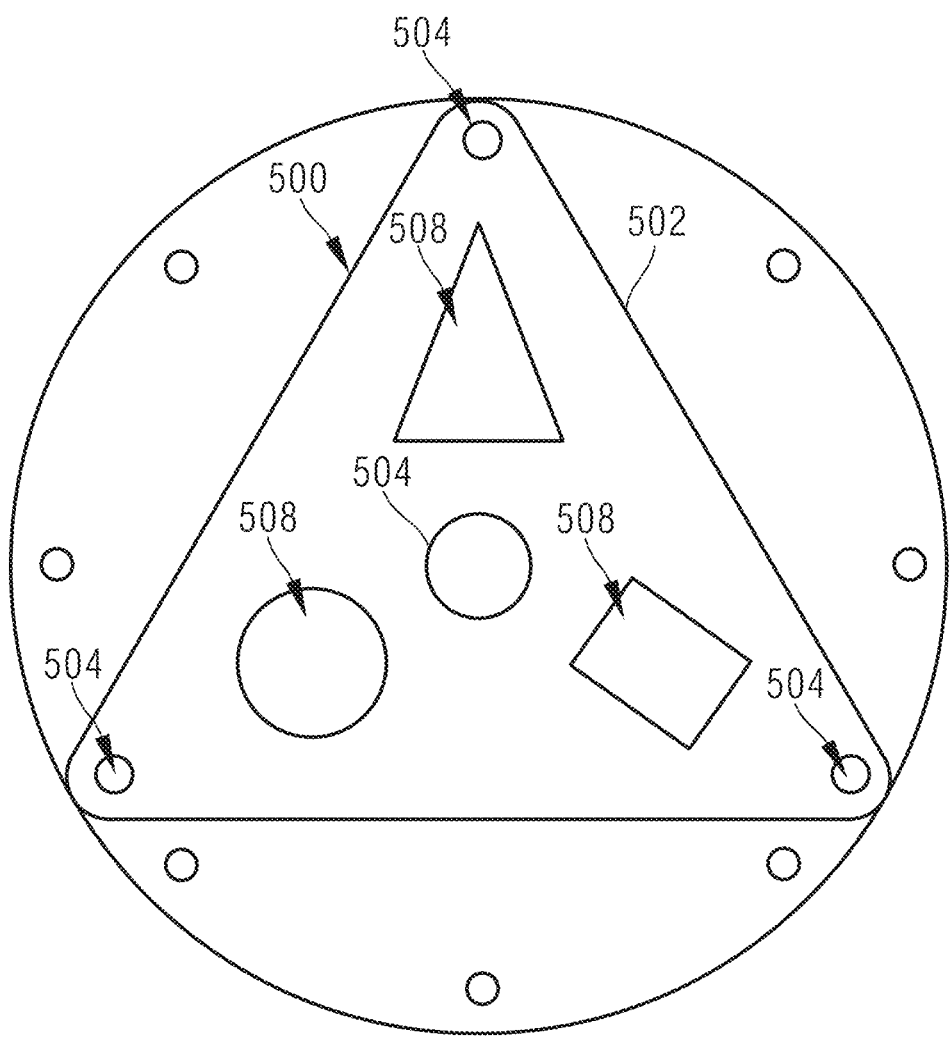
FIG. 5 is a schematic illustration of a coupling member in accordance with an embodiment of the present disclosure.

For example, turning now to FIG. 5, a schematic illustration of a coupling member 500 in accordance with an embodiment of the present disclosure is shown. The coupling member 500 may be similar to that shown and described above, but in this instance, the geometry of a coupling element 502 is different. In this embodiment, the coupling element 502 has a substantially triangular shape. The coupling element 502 includes connection elements 504 located at points of the triangular shape to enable engagement and connection with a rotary member or other structure. The material of the coupling element 502 is arranged about a hub 506, similar to that shown and described above.

Further, the material of the coupling element 502 includes a number of material voids 508 arranged about the material thereof, such that the total material (and weight) of the coupling member 500 may be reduced as compared to a solid component or piece. As shown, the material voids 508 may have different geometric shapes, which may be selected based on material and/or structural properties of the coupling member 500.

Figure 6:
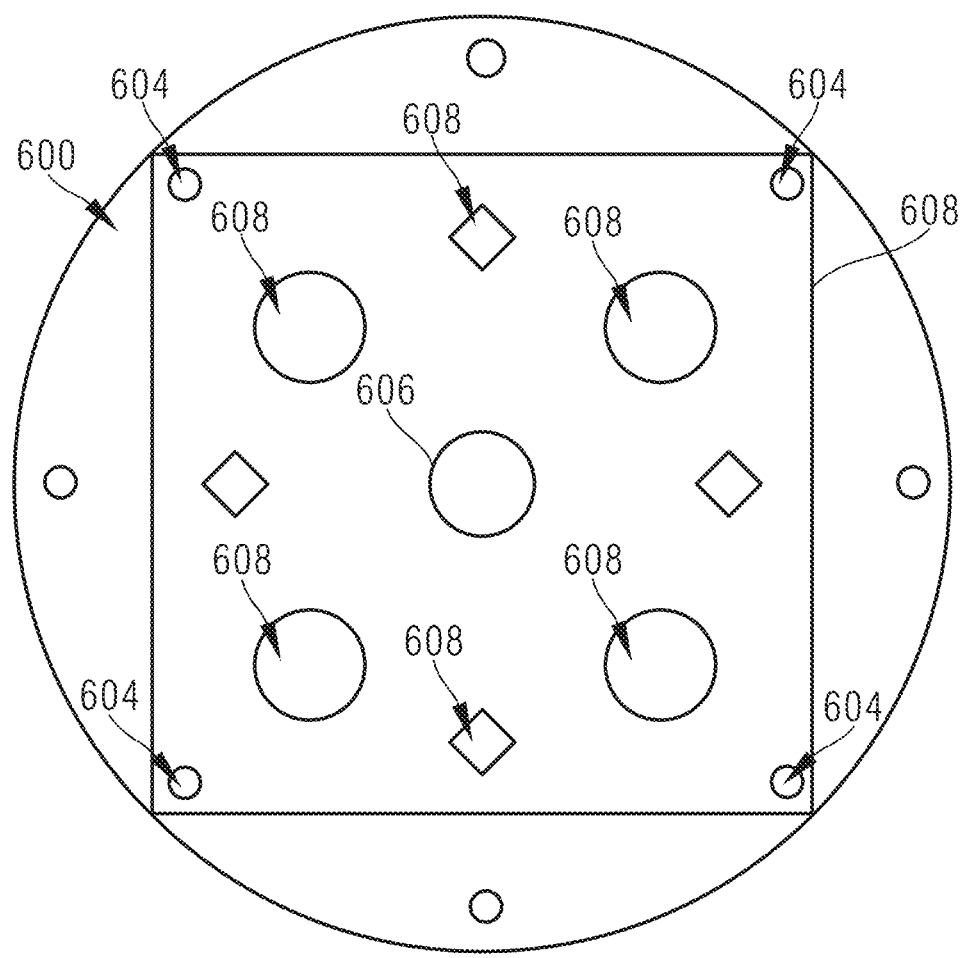
FIG. 6 is a schematic illustration of a coupling member in accordance with an embodiment of the present disclosure.

Turning now to FIG. 6, a schematic illustration of a coupling member 600 in accordance with an embodiment of the present disclosure is shown. The coupling member 600 may be similar to that shown and described above, but in this instance, the geometry of a coupling element 602 is different for earlier described and shown embodiments. In this embodiment, the coupling element 602 has a substantially square shape. The coupling element 602 includes connection elements 604 located at points (corners) of the square shape to enable engagement and connection with a rotary member or other structure. The material of the coupling element 602 is arranged about a hub 606, similar to that shown and described above. Further, the material of the coupling element 602 includes a number of material voids 608 arranged about the material thereof, such that the total material (and weight) of the coupling member 600 may be reduced as compared to a solid component or piece. As shown, the material voids 608 may have different geometric shapes, which may be selected based on material and/or structural properties of the coupling member 600.

The above shown and described shapes and geometries are merely for example and explanatory purposes and are not intended to be limiting. Other shapes, sizes, arrangements, geometries, etc. may be employed without departing from the scope of the present disclosure. For example, star shapes, gear shapes, square or other polygon with any number of sides, lobed, spoked, etc. That is, in accordance with embodiments of the present disclosure, the coupling elements are non-circular (i.e., less than an equivalent circle of the same radius). The non-circular geometries enables a potentially significant reduction in the amount of material used as compared to conventional circular structures. It will be appreciated that the two coupling elements may have the same or similar structures, as illustratively shown. However, in other embodiments, the two coupling elements may have different geometric shapes, such as one having a triangular shape and the other being square or rectangular.

Figure 7:
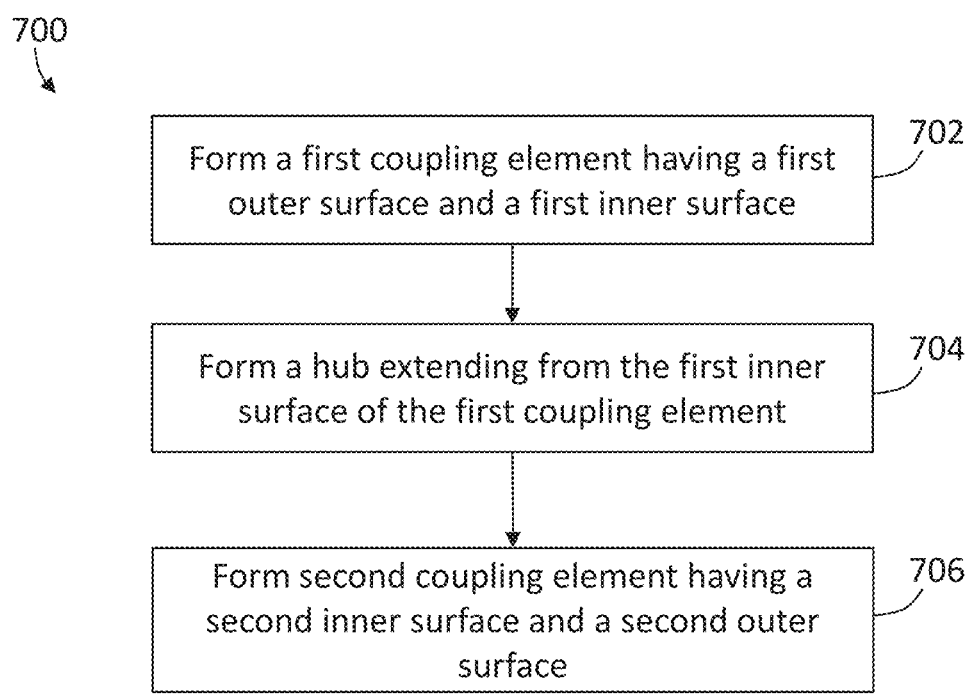
FIG. 7 is an example flow process for manufacturing a coupling member in accordance with an embodiment of the present disclosure.

Turning now to FIG. 7, an example flow process 700 for forming a coupling member in accordance with an embodiment of the present disclosure is shown. The flow process 700 may be used to form a coupling member as shown and described above and/or variations thereon. The flow process 700, in accordance with an embodiment of the present disclosure, is an additive manufacturing process that is employed to form a single structure, single body, or continuous body coupling member. That is, a single material may be formed into the structure of the coupling member, without the need for attachments, bonding, welding, or other mechanical or chemical joining of components or pieces. In some embodiments, the aspects or steps of the flow process 700 may be performed sequentially in a continuous formation process (e.g., layer deposition during additive manufacturing). In other embodiments of the present disclosure, the blocks or steps of the flow process 700 described with respect to FIG. 7 may be performed simultaneously or substantially simultaneously. For example, rather than building (e.g., layer deposition) from one coupling element to another, as described below, the orientation of formation may be that the coupling elements are formed simultaneously, or substantially simultaneously, using an additive process. Such different may occur, in part, based on an orientation of manufacture, as will be appreciated by those of skill in the art.

At block 702, a first coupling element having a first outer surface and a first inner surface are formed. The first coupling element has a material thickness between the first outer surface and the first inner surface. The first coupling element is formed with one or more connection elements to enable engagement and connection with another component (e.g., a rotary member of a machine). The geometric shape of the first coupling element can include one or more structural branches that extend from a central aperture (hub). The material of the first coupling element is formed from the first outer surface and may be built up by an additive process to build a thickness of the first coupling member and ending at the first inner surface. The material of the first coupling element can include one or more material voids, as shown and described above.

The process continues to block 704, wherein a hub is formed that extends from (normal to) the first inner surface of the first coupling element. The hub is formed as a cylindrical body and may be hollow. The hub is formed with a hub length that extends a determined distance from the first inner surface. As such, the hub includes a first end that is formed and integral with the first coupling element.

The process continues to block 706, wherein a second coupling element is formed at an end of the hub opposite the first coupling element. That is, the second coupling element may be formed and integral with a second end of the hub. As such, the formed coupling member is a continuous, unitary, and single piece or body formed by an additive process. That is, the coupling member does not include any subparts or components that are attached together using conventional mechanical and/or chemical means (e.g., fasteners, adhesives, welding, bonding, connectors, etc.).

The second coupling element is formed with a second inner surface, at the hub, and a second outer surface opposite thereof. The second coupling element has a material thickness between the second inner surface and the second outer surface. The second coupling element is formed with one or more connection elements to enable engagement and connection with another component (e.g., a rotary member of a machine). The geometric shape of the second coupling element can include one or more structural branches that extend from a central aperture (hub). The material of the second coupling element is formed from the second inner surface and may be built up by the additive process to build a thickness of the second coupling member and ending at the second outer surface. The material of the second coupling element can include one or more material voids, as shown and described above.

During the process of forming the coupling member in accordance with flow process 700, the first outer surface, the first inner surface, the second inner surface, and the second outer surface may each define a plane that is parallel to each other, with the hub being formed with a hub axis that is normal to each of the planes.

Because of the ability to form unique geometries of parts using additive processes, the design, geometry, shape, and material employed in the flow process 700 may be selected based on modeling, rather than mechanical or other constraints (or at least minimizing the impact of such constraints/considerations). Using finite element modeling and/or topology optimization, a light weight, single component, flexible diaphragm coupling, which can be customized/ tailored (torque tuned) to rotor dynamic requirements of specific turbo-machinery applications enabled.

The ability to provide any arbitrary shape optimized to meet any chosen constraint may provide further advantages when coupling members such as those described herein are used in combination with a stiff static shroud. In such arrangements a gap between the flexible coupling element and a stiff static surrounding shroud may provide a limit to the extent of displacement between the elements of the coupling member. This can protect the coupling from brief periods of high torque/overload.

Figure 8A:
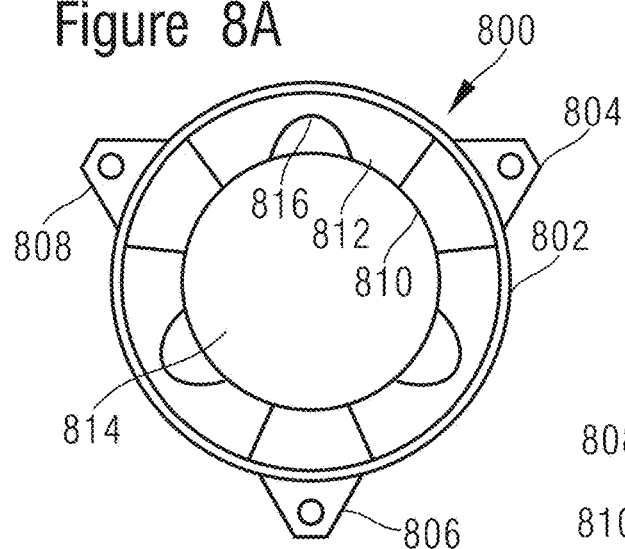
FIG. 8A is a schematic illustration of a stiff static shroud for use with a coupling member such as that shown in FIG. 3A.

FIG. 8A shows one such shroud 800 for use with a coupling member 300 such as that described above with reference to FIG. 3A. The shroud 800 comprises a cylindrical outer wall 802, having a plurality of feet 804, 806, 808 at a first end of the cylindrical wall 802 to provide a base.

The second end of the cylindrical wall is closed by a disc member 810. The outer edge of the disc member 810 adjoins the cylindrical wall 802. A void in the middle of the disc member 810 provides an aperture 814 so that the disc member 810 is essentially annular, but its inner edge is non-circular. The non-circular nature of the inner edge of the annulus arises from a set of keying features 816 disposed in the inner edge of the disc 810.

The keying features 816 comprise deviations of the inner edge from a circular shape, for example outward radial excursions of the edge which may be rather like bites taken from the inner edge of the annulus 810. These keying features 816 may be curved in the manner of gear teeth, for example they may provide a part of the inner edge with an involute or cycloidal curve form.

The disc member 810 may be thicker at the edges of the keying features 816 than in other areas of the disc member 810. For example, as illustrated in FIG. 8A, the disc 810 may comprise thick portions 812. The thick portions 812 may be arc shaped regions of the annular disc 810, separated by thinner regions of the disc 810. Thus the inner radial edge of the annular disc 810 may be thicker at the keying features 816 than it is between these portions 812.

The feet 804, 806, 808 extend radially outward from the base of the cylindrical wall, and are spaced apart about the circumference of the cylindrical wall. The feet may comprise connection elements, such as threaded holes, to enable the shroud 800 to be fixed to a rotary member. Disposed between the feet 804, 806, 808 in the first end of the cylindrical wall 802 are recesses 820. In addition, disposed in the cylindrical wall 802 between the first end the second end of 800 of the cylindrical wall 802 are slots 822.

Figure 8B:
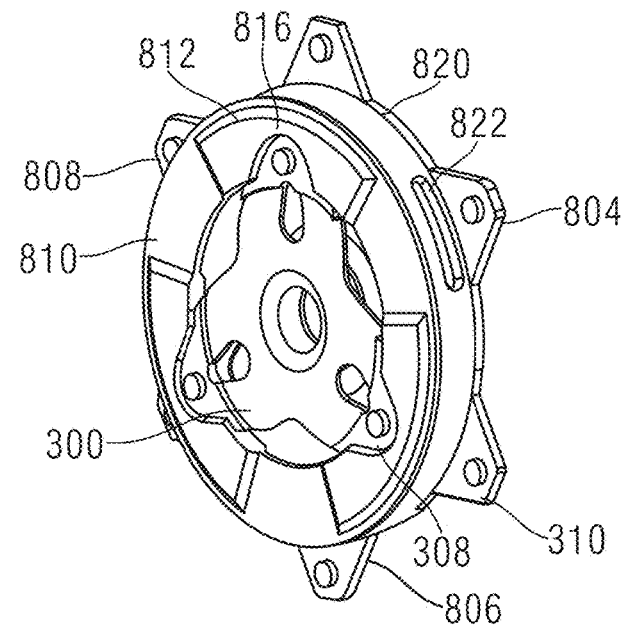
FIG. 8B is an isometric illustration of an apparatus comprising the stiff static shroud illustrated in FIG. 8A in use with a coupling member such as that shown in FIG. 3A.
Figure 8C:
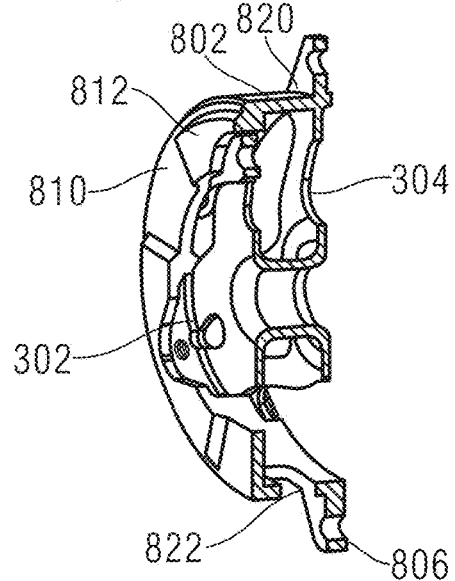
FIG. 8C is a cut away view of the isometric illustration shown in FIG. 8B.
Figure 8D:
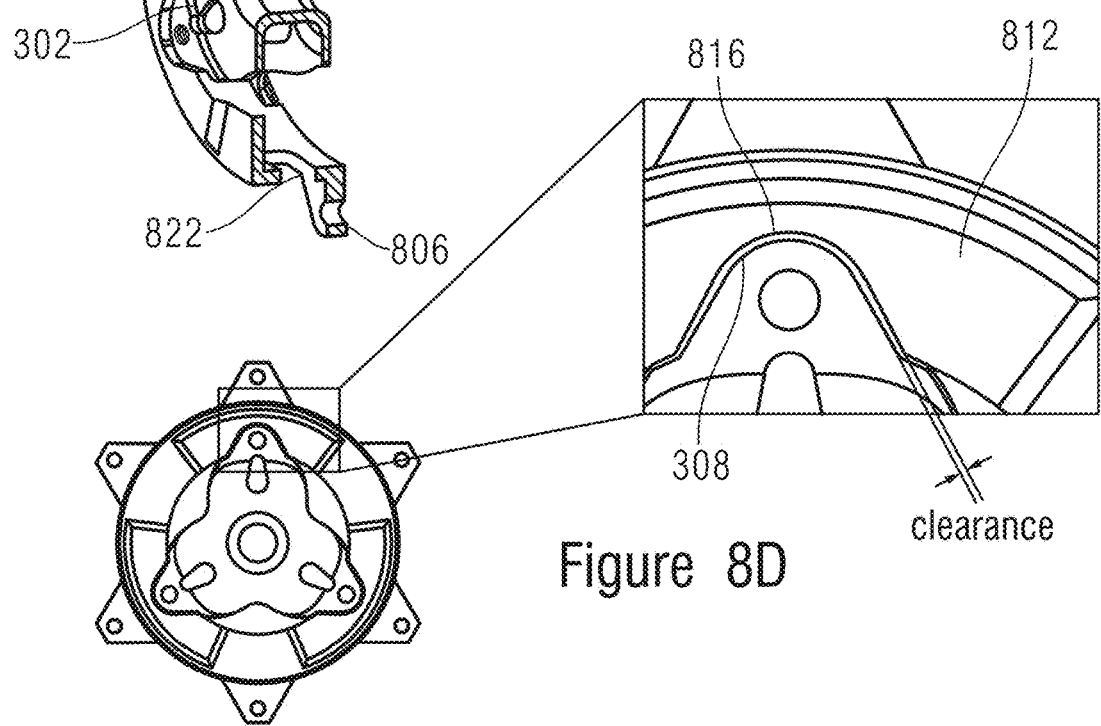
FIG. 8D comprises a plan view of the apparatus illustrated in FIG. 8B and comprises an inset showing an enlarged view of a part of the apparatus.

FIG. 8B, FIG. 8C, and FIG. 8D illustrate the shroud 800 in use with a coupling member 300 such as that described above with reference to FIG. 3. In the configuration illustrate in these drawings the coupling member 300 is arranged so that the first coupling element 302 is disposed in the aperture 814 and is aligned in a plane defined by the annular disc 810. The hub 306 of the coupling member 300 is concentric with the shroud 800 and the hub axis is aligned with the cylindrical walls 802. The second coupling element 304 is aligned in a plane defined by the recesses 820 at the first end of the shroud 800. Thus the connection elements 310 of the second coupling element 304 may protrude radially out from the shroud 800 at its base. Thus the shroud 800 and the second coupling element 304 may be affixed (e.g. bolted) together to the same rotary member (such as 208 in FIG. 2A).

The size of the recesses 820 may match the size of the connection element 310 that protrudes out through the wall 802 via the recess 820. This, and the fixing of the second coupling element 304 shroud 800 to the rotary member may serve to rigidly fix together the second coupling element 304 shroud 800.

The first coupling element 302 sits inside the aperture 814 in the same plane as the annular disc 810. The connection elements 308 of the first coupling element 302 are disposed in the keying features 816 of the annular disc 810. The first coupling element 304 and the aperture 814 may have complementary shape. For example the connection elements 308 (or other parts of the first coupling element 304) may have a shape which corresponds to (e.g. matches) the shape of the inside edge of the aperture 814. The aperture 814 however is larger than the first coupling element 302. Thus there is some space between the two around at least a part of the edges of the first coupling element 302. This spacing provides a degree of torsional flexibility between the first coupling element 302 and the shroud 800 due to the free-play provided by this clearance/spacing.

It will be appreciated from an inspection of FIG. 8B and FIG. 8C, that the annular disc 810 of the shroud 800 provides a limit on the extent of torsion that can be applied between the first coupling element 302 and the second coupling element 304. If this limit is exceeded, the inner edges of the keying features 816 will bear against the outer edges of the first coupling element 302. This provides an overload feature which may inhibits excessive torsion of the hub 306.

As can best be seen in the inset of FIG. 8D, the first coupling element 302 and the keying features 816 may have mutually complementary form, so that one fits within the other and they may be shaped so that when the edge of the first coupling element 302 bears on the keying feature 816 load is distributed along a length of the edge.

The shroud may be stiffer than the coupling element 300, for example it may comprise a stiffer material. Thus in operation, when sufficiently high torque is applied to the coupling member 300, the first coupling element is twisted with respect to the second coupling element until the first coupling element butts up against the shroud. The stiffer shroud then reinforces the coupling element until the excess torque is removed.

Figure 9A:
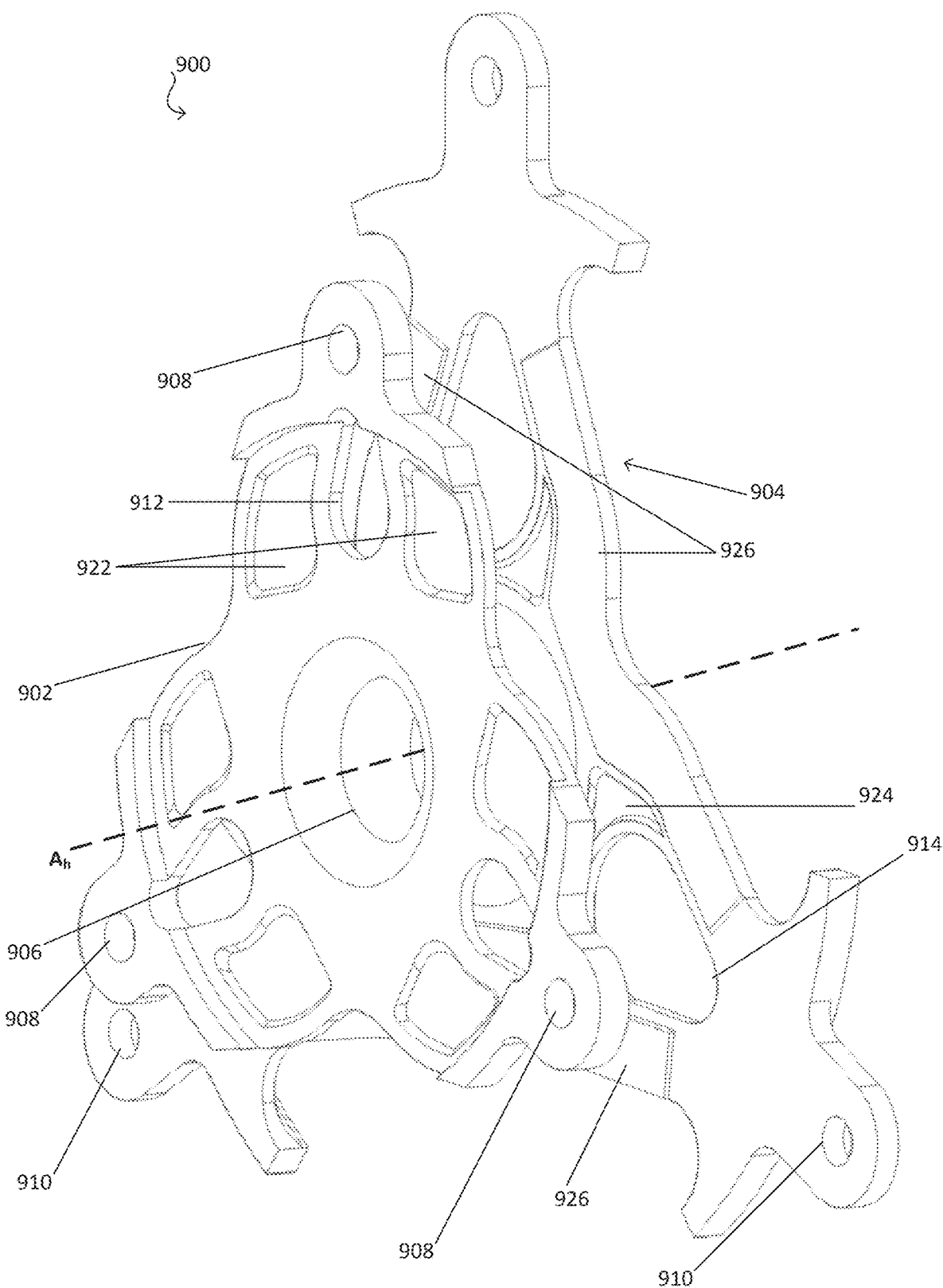
FIG. 9A is an isometric illustration of a coupling member having contoured coupling elements comprising regions of different thickness.
Figure 9B:
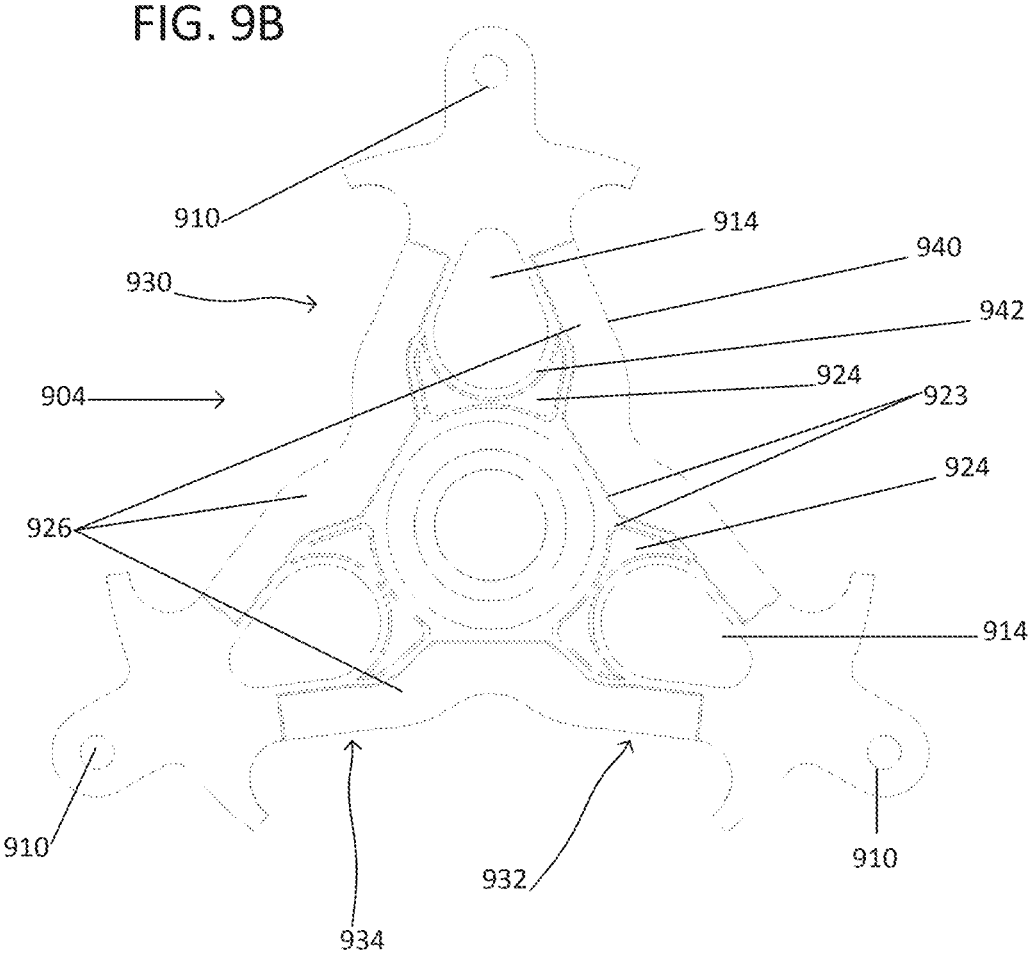
FIG. 9B is a plan view of the second coupling element of the coupling member illustrated in FIG. 9A.
Figure 9C:
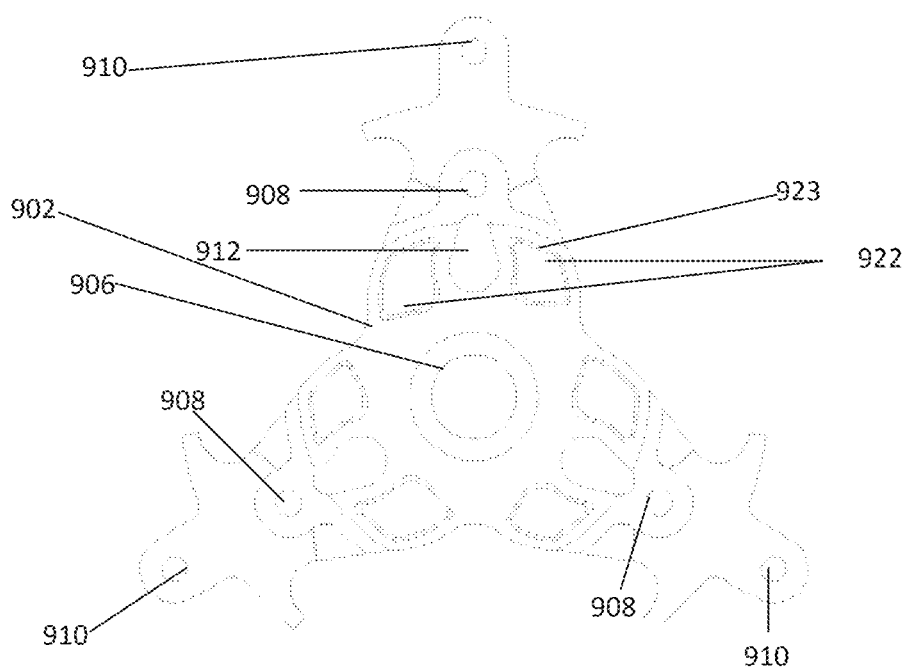
FIG. 9C is a plan view of the coupling member illustrated in FIG. 9A The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

Turning now to FIGS. 9A-9C, schematic illustrations of a coupling member 900 in accordance with an embodiment of the present disclosure are shown. The coupling member 900 may be used to couple, join, or otherwise operably connect two separate machines, particularly two rotary members (e.g., drive shafts) to enable transmission of rotational action from one machine to the other. FIG. 3A is an isometric illustration of the coupling member 300 Turning now to FIGS. 9A-9C, schematic illustrations of a coupling member 900 in accordance with an embodiment of the present disclosure are shown. The coupling member 900 may be used to couple, join, or otherwise operably connect two separate machines, particularly two rotary members (e.g., drive shafts) to enable transmission of rotational action from one machine to the other. FIG. 9A is an isometric illustration of the coupling member 900. The coupling member comprises a first coupling element 902 and a second coupling element 904 connected by a hub 906. The first coupling element 902 and the second coupling element 904 are each planar structures, which are parallel with each other. The hub 906 is essentially cylindrical, having a central hub axis $A_h$. The two coupling elements 902, 904 are disposed at opposite ends of the hub, perpendicular to this axis $A_h$ which passes through the centre of each of them 902, 904.

The first coupling element 902 may be formed as a plate to provide for engagement with, for example, a first rotary member of a first machine, and the second coupling element 904 may also be formed as a plate to provide for engagement with, for example, a second rotary member of a second machine. The first coupling element 902 includes a plurality of first connection elements 908 arranged about a circle that is defined, in part, by the first coupling element 902. Similarly, the second coupling element 904 includes a plurality of second connection elements 910 arranged about a circle that is defined, in part, by the second coupling element 904. The first and second connection elements 908, 910 may include apertures (e.g., threaded apertures) for receiving fasteners to engage with a rotary member or other structure. The hub 906 which connects the first and second coupling elements 302, 304 and provides for flexibility (e.g., relative movement, rotation, bending, etc. between the first and second coupling elements 902, 904). FIG. 9B is a plan view of the second coupling element 904 of the coupling member 900, and FIG. 9C is a plan view of the coupling member 900 in which the second coupling element 904 is partly hidden by the first coupling element 902.

It can thus be seen that coupling member 900 shown in FIG. 9 corresponds to that of the coupling member 300 described above with reference to FIG. 3A to FIG. 3E. The structure of the coupling member 900 shown in FIG. 9A to 9E may be identical to that of the coupling member 300 of FIG. 3A to FIG. 3E other than as described below. In particular, in addition to comprising material voids 912, 914, the coupling elements 902, 904 of the coupling member illustrated in FIG. 9A to 9C may also comprise thin regions 922, 924 and reinforced regions 926 (e.g. thicker parts of the plate, such as lands and ribs) disposed in selected regions of either or both the plate like coupling elements 902, 904. In these regions the thickness of the plate which makes up the coupling elements can also be reduced/contoured in accordance with the stress distribution. So in regions of the coupling member which experience high stress in use, the thickness of the coupling member may be increased. In the case of additive manufacture methods, such as 3D printing, this can be done by simply adding more material. Conversely, in regions of the coupling member where stress and/or strain are lower the thickness of the plate can be reduced. This can reduce weight, as the material voids do, but without risking high stress concentrations. As illustrated the boundaries 913, 923 of the thin regions 922, 924, and the reinforced regions 926 may be chamfered, and corners of these boundaries 913, 923 may be radiused.

A variety of arrangements of these structures may be used, and the particular arrangement of the voids 914, thin regions 924, and thick regions 926 on the coupling elements 902, 904 may vary between implementations. One particular implementation will now be described with reference to FIG. 9B, which shows a plan view of the second coupling element 904 of the coupling member 900. It can be seen that in this arrangement the coupling element 904 comprises three tapered arms. The sides of these arms each taper from a broad base near the hub 906 toward a connection element 910 at the radially outward end of the arm 930, 932, 934. It can thus be seen that the angular extent (angle subtended at the hub axis in the plane of the coupling element) of the arms may generally reduce with radial distance from the hub axis. In addition to this generally tapered form, the arms may carry circumferential projections out from the arms in the plane of the coupling element.

It can thus be seen that the side edges 940 of the arms 930, 932, 934, provide the periphery of the coupling element 904 and link adjacent connection elements 910.

At least part of these side edges may comprise a thick region 926, which is thicker than the other parts of the coupling element. These thick regions 926 may be provided along both side edges of the arms 930, 932, 934. A region of the arms 930, 932, 934, may comprise a void 914 in which the material of the coupling element 904 is absent. The void 914 may be bounded by a linking portion of material (such as a ridge or rib) 942 which is a first thickness, thinner than the thick regions 926. The arms may also comprise a thinner portion 924, having a second thickness thinner than the first thickness of the linking portion 942. The thinner portion 924 may be entirely surrounded by linking portions 942 of material having the second thickness. The edges 923 of the linking portions 942 adjacent the thinner portions may be chamfered.

The thick portions 926 may be bounded on their inboard edges by linking portions 942 of material having the first thickness. The edges of the thick portions 926 adjacent the linking portions 942 may also be chamfered.

It can thus be seen that the coupling element 904 comprises four types of regions (a) voids, in which the material is absent; (b) linking portions having a first thickness; (c) thinner portions having a second thickness, less than the first thickness; and (d) thick portions being greater than the first thickness. The boundaries between these different types of regions may be provided by chamfered edges, wherein the edge of the thicker region is chamfered down. Advantageously, such structures may also be provided as a single integrally formed piece of material, e.g. free of joins, fractures, and or asperities. Accordingly it may comprise a unitary body construction formed as a single piece or component, and does not include attached or assembled sub-parts. That is a single piece of a continuous material without any joints, welds, fasteners, adhesives, bonding materials, or other joining/attaching features or aspects (mechanical and/or chemical). To achieve the unitary body formation various manufacturing processes may be employed, including, without limitation, casting, molding, machining, and additive manufacturing. The specific geometry and arrangement of features of the coupling member 900 may be configured based on topology optimization. Such topology optimization is a mathematical method that optimizes material layout within a given design space, for a given set of loads, boundary conditions, and constraints with the goal of maximizing the performance of the system. Such topology optimization may be used with additive manufacturing processes to form a desired shape, geometry, and configuration of a coupling member, as described herein, or variations thereon based on the above described considerations.

By using these and other manufacturing methods, providing structures such as those described with reference to FIG. 9 has been found to provide significantly improved fatigue characteristics in simulation of component performance as compared to coupling members in which the coupling elements comprise only regions of a single thickness and voids.

A simulation was performed using ANSYS® (A software package available from Ansys, Inc. a global public company based in Canonsburg, Pennsylvania) to compare two coupling members 300, 900.

The first coupling member 300 simulated had a geometry such as that illustrated in FIG. 9 but without thicker portions 926 or thinner portions 924. It was modelled as having fixed, rigid, support of the second coupling member 904 and a torque load of 1000 N/m about the hub axis $A_h$ applied to the first coupling element 902 in the presence of an angular misalignment (angle between the plane of the two coupling elements) of 0.5 degrees. This arrangement was found to have a minimum fatigue life of 72 million cycles. By comparison, a second coupling member having the geometry illustrated in FIG. 9 but having thick portions and thin portions as described above was also simulated under these same conditions and found to have a minimum fatigue life of 104 million cycles. It can thus be seen that, for a given geometry of coupling member, the provision of thicker regions 926 and/or thinner regions 924 arranged according to the stress distribution in the coupling member and in a coupling member of unitary construction may provide improved performance and increased fatigue life.

It will be appreciated that other types of manufacturing and/or formation processes may be employed without departing from the scope of the present disclosure, thus, flow process 700 is merely for example only and is not to be limiting. For example, although the flow process 700 is described as a sequential process from one surface or element to the next, in a continuous manner, in some manufacturing processes, the entire coupling member may be formed in a single action (e.g., molding, casting, etc.) or in a different order or process (e.g., machining, milling, different order/orientation additive manufacturing, etc.). As such, although described as a sequential process from one outer surface to another outer surface, in other processes, a similar component having the same surfaces and arrangements may be formed, but in a different manner, whether in a different additive manufacturing orientation, or using an entirely different manufacturing process. The shroud described herein may be formed by the same processes.

Advantageously, embodiments described herein enable unique spoked (i.e., structural branches) designs. Such designs for coupling members may use considerably less material than prior coupling members. Further, such configurations may be more flexible and have less overhanging weight as compared to conventional configurations. As such, a reduction in a load to bearings used in such systems may be achieved. Furthermore, advantageously, such unitary, single-body coupling members may be less costly to produce with additive manufacturing (3D printing) techniques (less material, less energy, less time) as compared to conventional construction processes. In an embodiment there are provided coupling members to join two rotary members. The coupling members include a unitary body having a first coupling element, a second coupling element, and a hub, wherein the unitary body forms a single piece with the hub extending between and connecting the first coupling element to the second coupling element. The first coupling element defines a first plane, the second coupling element defines a second plane with the first and second planes being parallel, and the hub defines a hub axis normal to the first and second planes. Each of the first and second coupling elements comprise a plurality of connection elements arranged about a respective circumference having a respective radius extending from the hub axis, wherein a material of the respective coupling element in a respective circle and in a respective plane is less than the area of the circle.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A coupling member to join first and second rotary members, the coupling member comprising:
   a unitary body having a first coupling element, a second coupling element, and a hub, wherein the unitary body forms a single piece with the hub extending between and connecting the first coupling element to the second coupling element,
   wherein:
   the first coupling element defines a first plane, the second coupling element defines a second plane with the first and second planes being parallel, and the hub defines a hub axis normal to the first and second planes,
   the first coupling element comprises a plurality of first connection elements arranged about a circumference of a first circle having a first radius extending from the hub axis, wherein a material of the first coupling element in the first circle and in the first plane is less than the area of the first circle, and
   the second coupling element comprises a plurality of second connection elements arranged about a circumference of a second circle having a second radius extending from the hub axis, wherein a material of the second coupling element in the second circle and in the second plane is less than the area of the second circle;
   wherein the second circle is different than the first circle.

2. The coupling member of claim 1, wherein the hub has a third radius that is less than each of the first radius and the second radius.

3. The coupling member of claim 1, wherein the plurality of connection elements of the first coupling element are arranged in a triangular orientation.

4. The coupling member of claim 1, wherein the plurality of connection elements of the first coupling element are located at the end of structural branches of the first coupling element.

5. The coupling member of claim 1, wherein at least one of the first coupling element and the second coupling element include one or more material voids formed therein.

6. An apparatus comprising:
   the coupling member of claim 1; and
   a rigid shroud, the rigid shroud comprising:
      at least one connection element for fixing the shroud with respect to one of the first coupling element and the second coupling element of the coupling member;

a keying feature having a shape corresponding to a portion of the coupling member and being arranged to permit only a predetermined rotational displacement of the one of the first coupling element and the second coupling element with respect to the other one of the first coupling element and the second coupling element.

7. The apparatus of claim 6 wherein the keying feature has a shape which corresponds to an edge of the other one of the first coupling element and the second coupling element.

8. The apparatus of claim 7 wherein the shroud comprises an annular disc having an aperture, and the keying feature is provided by a portion of an edge of the aperture, wherein the portion of the edge of the aperture comprises a thick portion that is thicker than other parts of the disc member.

9. The apparatus of claim 6 wherein the shroud comprises a surrounding wall which joins the at least one connection elements to the keying feature, and being arranged to hold the keying feature in a plane defined by the other one of the first coupling element and the second coupling element wherein the keying feature is coplanar with the other one of the first coupling element and the second coupling element, and spaced from its edge by a clearance distance to permit only said predetermined rotational displacement, and to inhibit further rotational displacement by supporting the other one of the first coupling element and the second coupling element.

* * * * *